United States Patent
Berkey et al.

(10) Patent No.: US 7,496,244 B2
(45) Date of Patent: Feb. 24, 2009

(54) METHOD FOR GENERATING A LINEAR SINGLE POLARIZATION OUTPUT BEAM

(75) Inventors: George E. Berkey, Pine City, NY (US); Ming-Jun Li, Horseheads, NY (US); Daniel A. Nolan, Corning, NY (US); Donnell T. Walton, Painted Post, NY (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/498,658

(22) Filed: Aug. 3, 2006

(65) Prior Publication Data
US 2009/0003753 A1 Jan. 1, 2009

Related U.S. Application Data

(62) Division of application No. 10/696,928, filed on Oct. 30, 2003, now Pat. No. 7,120,340.

(51) Int. Cl.
*G02F 1/01* (2006.01)
*G02B 6/00* (2006.01)
*H01S 3/00* (2006.01)

(52) U.S. Cl. ............... 385/1; 385/11; 359/333; 359/341.1; 359/341.3; 359/342; 359/345

(58) Field of Classification Search .......... 385/11; 359/341.3
See application file for complete search history.

(56) References Cited

U.S. PATENT DOCUMENTS

| | | | |
|---|---|---|---|
| 5,166,940 A | 11/1992 | Tumminelli et al. | 372/6 |
| 5,561,675 A | 10/1996 | Bayon et al. | 372/6 |
| 5,844,927 A | 12/1998 | Kringlebotn | 372/6 |
| 6,151,429 A | 11/2000 | Kristensen et al. | 385/11 |
| 6,212,310 B1 | 4/2001 | Waarts et al. | 385/24 |
| 6,542,681 B2 | 4/2003 | Broeng et al. | 385/123 |
| 2002/0172485 A1 | 11/2002 | Keaton et al. | 385/127 |
| 2002/0172486 A1* | 11/2002 | Fermann | 385/128 |
| 2002/0196992 A1 | 12/2002 | Valente et al. | 385/10 |
| 2003/0086668 A1 | 5/2003 | Kliner et al. | 385/123 |
| 2003/0152115 A1 | 8/2003 | Jiang et al. | 372/6 |

FOREIGN PATENT DOCUMENTS

| | | |
|---|---|---|
| EP | 0758493 B1 | 4/1999 |
| WO | WO 96/27223 | 9/1996 |
| WO | WO 02/079825 A1 | 10/2002 |

OTHER PUBLICATIONS

"Single-Polarization Fiber Lasers Using Bragg Gratings in Hi-Bi Fibers", D. Pureur, et al Journal of Lightwave Technology 13(1995) Mar. No. 3.
"Development of an Absolute Single-Polarization Optical Fiber" Y. Kubo, et al, 1991.

(Continued)

*Primary Examiner*—Frank G Font
*Assistant Examiner*—Ryan Lepisto
(74) *Attorney, Agent, or Firm*—Gregory V. Bean

(57) ABSTRACT

A method for generating a linear single-polarization output beam comprises providing an optically active linearly birefringent and linearly dichroic fiber for propagating light and having a single polarization wavelength range and a gain bandwidth; optically pumping the optically active linearly birefringent and linearly dichroic fiber for obtaining fluorescence within the gain bandwidth; and aligning the single-polarization wavelength range to overlap a desired spectral region of the gain profile.

4 Claims, 11 Drawing Sheets

OTHER PUBLICATIONS

"Single Polarisation fibre DFB laser" Electronic Letters 2nd Jan. 1997 vol. 33, No. 1.

"Single-polarization fiber with a high extinction ration", Daniel A. Nolan, et al Optics Letters Aug. 15, 2004/ vol. 29, No. 16.

"Polarization-maintaining amplifier employing double-clad bow-tie fiber", Dahv. A. V. Kliner, et al Optics Letters/ vol. 27, No. 4/ Feb. 15, 2001.

* cited by examiner

METHOD FOR GENERATING A LINEAR SINGLE POLARIZATION OUTPUT BEAM

This is a divisional of U.S. patent application Ser. No. 10/696,928 filed on 30 Oct. 2003, the content of which is relied upon and incorporated herein by reference in its entirety, and the benefit of priority under 35 U.S.C. § 120 is hereby claimed.

Parts of this invention were made with Government support under Agreement No. MDA972-02-3-004 awarded by DARPA. The Government may have certain rights in some of the claims of the invention.

This patent application is related to patent application 60/479,892, filed Jun. 19, 2003 and assigned to the same assignee.

BACKGROUND OF THE INVENTION

1. Field of the Invention

The present invention relates generally to optically active devices, and more particularly to a single polarization optical fiber laser or amplifier.

2. Technical Background

Rare-earth doped fiber lasers such as ytterbium-doped fiber lasers are finding uses in such areas as materials processing, product marking and engraving, and micromachining. Ytterbium-doped fiber lasers operating with high-power, narrow linewidth, and high pulse energy are being developed. The application space of fiber lasers would be broadened by the availability of additional operating wavelengths and even higher output powers. Each could be achieved through non-linear wavelength conversion and the coherent combination of several fiber lasers, respectively. Linearly polarized output, required for many of these applications, has been studied to a lesser extent than other attributes of fiber lasers.

Hence, it may be useful and even necessary in certain applications to have emission available that is linearly polarized in a stable direction of polarization for lasers and amplifiers. For linear or single polarization, it is desirable to obtain an optical polarizing (PZ) fiber which receives randomly elliptically polarized input light and provides output light polarized only along a single polarization. The polarization characteristic (single polarization) propagates one, and only one, of two orthogonally polarized polarizations while suppressing the other polarization by increasing its transmission loss. Such single polarization fibers generally have an azimuthal asymmetry of the refractive index profile. Single polarization optical fibers are useful for ultra-high speed transmission systems or for use as a coupler fiber for use with and connection to optical components (lasers, EDFAs, optical instruments, interferometric sensors, gyroscopes, etc.). Single polarization or linearly polarized lasers can be used to obtain an emission of a linearly polarized transversal monomode light wave useful in a large variety of fields. These fields include telecommunications, optical transmission, instrumentation, spectroscopy, medicine, the detection of chemical species and telemetry. Similarly, a linearly polarized fiber amplifier (LPFA), instead of a conventional Erbium Doped Fiber Amplifier (EDFA), when all or a portion of the PZ fiber doped with a rare-earth dopant is optically pumped, has significantly higher gain for one linear polarization state than for the orthogonal state for use with fiber-optic gyroscopes, interferometric fiber sensors, nonlinear frequency conversion, polarization multiplexing, and most designs of phase or amplitude modulators, as some more specific examples. By having such polarized fiber lasers or amplifiers, increased scaling power is achievable by employing known polarization beam multiplexing (PBM) to combine two beams into a single output having different polarization modes as long as they are orthogonally polarized.

Slight improvement in the polarization performance of single mode optical waveguides has been achieved by elongating or distorting the fiber core symmetry as a means of decoupling the differently polarized waves. However, the noncircular geometry and the associated stress-induced birefringence alone are, generally, not sufficient to maintain the desired single polarization for use as an improved fiber laser or fiber amplifier or their polarization beam multiplexing for improved power scaling.

It has, therefore, been an area of ongoing development to obtain a fiber laser or fiber amplifier providing single polarization that is maintainable and sufficient for power scaling through PBM.

Furthermore, linear single-polarization (SP) fiber laser oscillators or amplifiers that are robust and stable to external perturbations are required. By robust and stable it is meant devices that maintain single-linear polarization.

There is also a need to make SP fiber laser oscillators or amplifiers with large effective area for high power applications in order to avoid non-linear effects such as Raman and Brilluoin scattering.

There is also need to have stable linear SP fiber oscillators and amplifiers for optical power scalability using coherent-beam combination techniques.

Finally, SP fiber laser oscillators and or amplifiers are needed in order to avoid—at high output powers—temporal instabilities caused by non-linear coupling of co-propagating orthogonal polarization modes.

SUMMARY OF THE INVENTION

Definitions

The following definitions and terminology are commonly used in the art.

Refractive index profile—the refractive index profile is the relationship between the refractive index ($\Delta\%$) and the optical fiber radius (as measured from the centerline of the optical fiber) over a selected segment of the fiber.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent $\Delta\%$—the term $\Delta\%$ represents a relative measure of refractive index defined by the equation:

$$\Delta\% = 100 \times (n_i^2 - n_c^2)/2n_i^2$$

where $\Delta\%$ is the maximum refractive index of the index profile segment denoted as i, and $n_c$, the reference refractive index, is taken to be the refractive index of the cladding layer. Every point in the segment has an associated relative index measured relative to the cladding.

Alpha-profile—the term alpha-profile refers to a refractive index profile of the core expressed in terms of $\Delta(b)$ % where b is the radius, and which follows the equation:

$$\Delta(b)\% = [\Delta(b_0)(1-[\alpha b-b_0\alpha/(b_1-b_0)]^\alpha] \times 100,$$

where $b_0$ is the maximum point of the profile of the core and $b_1$ is the point at which $\Delta(b)$ % is zero and b is the range of $b_i$ is the range of $b_i$ less than or equal to b less than or equal to $b_f$, where $\Delta\%$ is defined above, $b_i$ is the initial point of the alpha-profile, $b_f$ is the final point of the alpha-profile, and alpha is an exponent which is a real number. The initial and final points of the alpha profile are selected and enter into the computer model. As used herein, if an alpha-profile is preceded by a step index profile, the beginning point of the $\alpha$-profile is the intersection of the $\alpha$-profile and the step profile. In the model, in order to bring out a smooth joining of the $\alpha$-profile with the profile of the adjacent profile segment, the equation is written as:

$$\Delta(b)\% = [\Delta(b_a)+[\Delta(b_0)-\Delta(b_a)]\{1-[\alpha b-b_0\alpha/(b_1-b_0)]^\alpha\}] \\ 100,$$

where $b_a$ is the first point of the adjacent segment.

In accordance with embodiments of the present invention, a linearly birefringent and linearly dichroic optical waveguide is first designed and/or measured to determine the single polarization wavelength range. Then the linearly birefringent and linearly dichroic optical waveguide is doped with active dopants in the core for providing operation of the waveguide in an operating wavelength range for overlapping with the single polarization wavelength range.

Preferably, air or vacuum filled holes are positioned close to an elliptical core of the linearly birefringent and linearly dichroic optical waveguide such that the waveguide exhibits a differential polarization dependent loss (PDL) greater than 70 dB in the wavelength band of single polarization operation. The optically-active linearly birefringent and linearly dichroic optical waveguide, thus formed in accordance with the invention finds excellent utility in a single linear polarization system including an optical component optically coupled to the optically-active linearly birefringent and linearly dichroic optical waveguide.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

For purposes of the description herein, it is to be understood that the invention may assume various alternative configurations, except where expressly specified to the contrary. It is also to be understood that the specific fibers illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise. Like functions of similar elements will be referenced by the same numbers.

Figure 6:
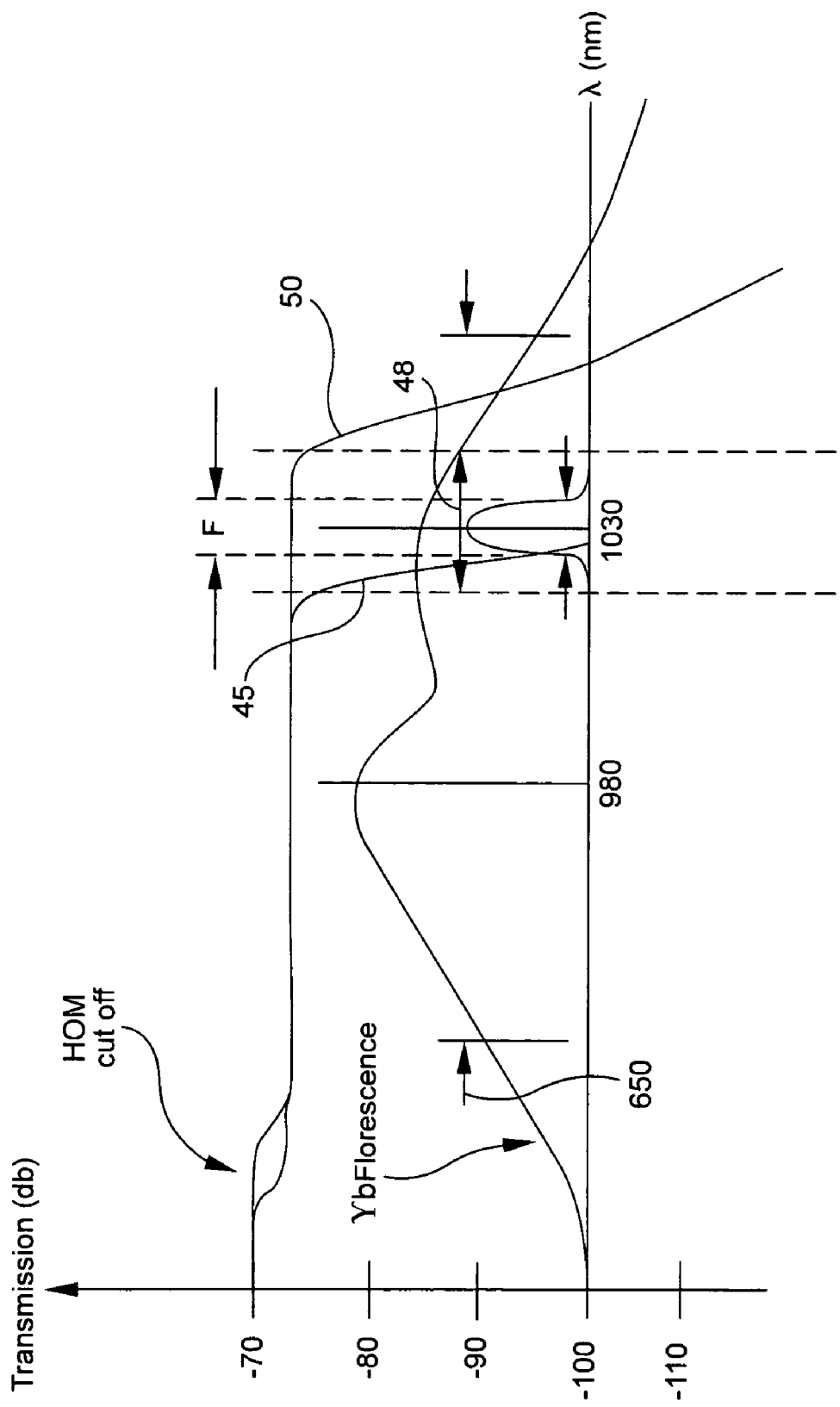
FIG. 6 is a plot illustrating a representative wavelength band of single polarization of an embodiment of the single polarization optical fiber 30 aligned with a plot illustrating a representative grating filter bandwidth of the input mirror 60 centered with the cutoff wavelength of the second polarization 50 within the gain bandwidth 650 of the single polarization optical fiber 30, operated as a laser of FIG. 1, in accordance with the invention.

Referring to FIG. 6, wavelength spectrum of an optically active linear single polarization device, in accordance with the teachings of the present invention is shown. A linearly birefringent and linearly dichroic optical waveguide, such as a fiber 30 of FIG. 1, or an undoped single polarization fiber 30' fused with a doped elliptical core in a fiber section 20 of FIG. 12, propagates light having polarization components along a first linear polarization characteristic mode 45 and along a second linear polarization characteristic mode 50 with a sufficient differential polarization dependent loss (PDL is approximately greater than 3 dB) between the first and second modes accumulated over a sufficiently long waveguide length such that the first polarization mode has a first attenuation of 3 dB at a first cut-off wavelength 601 and the second polarization has a second attenuation of 3 dB at a second cut-off wavelength 602 to provide a single polarization wavelength range 48 having a single polarization center wavelength between the first and second cut-off wavelengths such that the first cut-off wavelength is less than the second cut-off wavelength.

Figure 1:
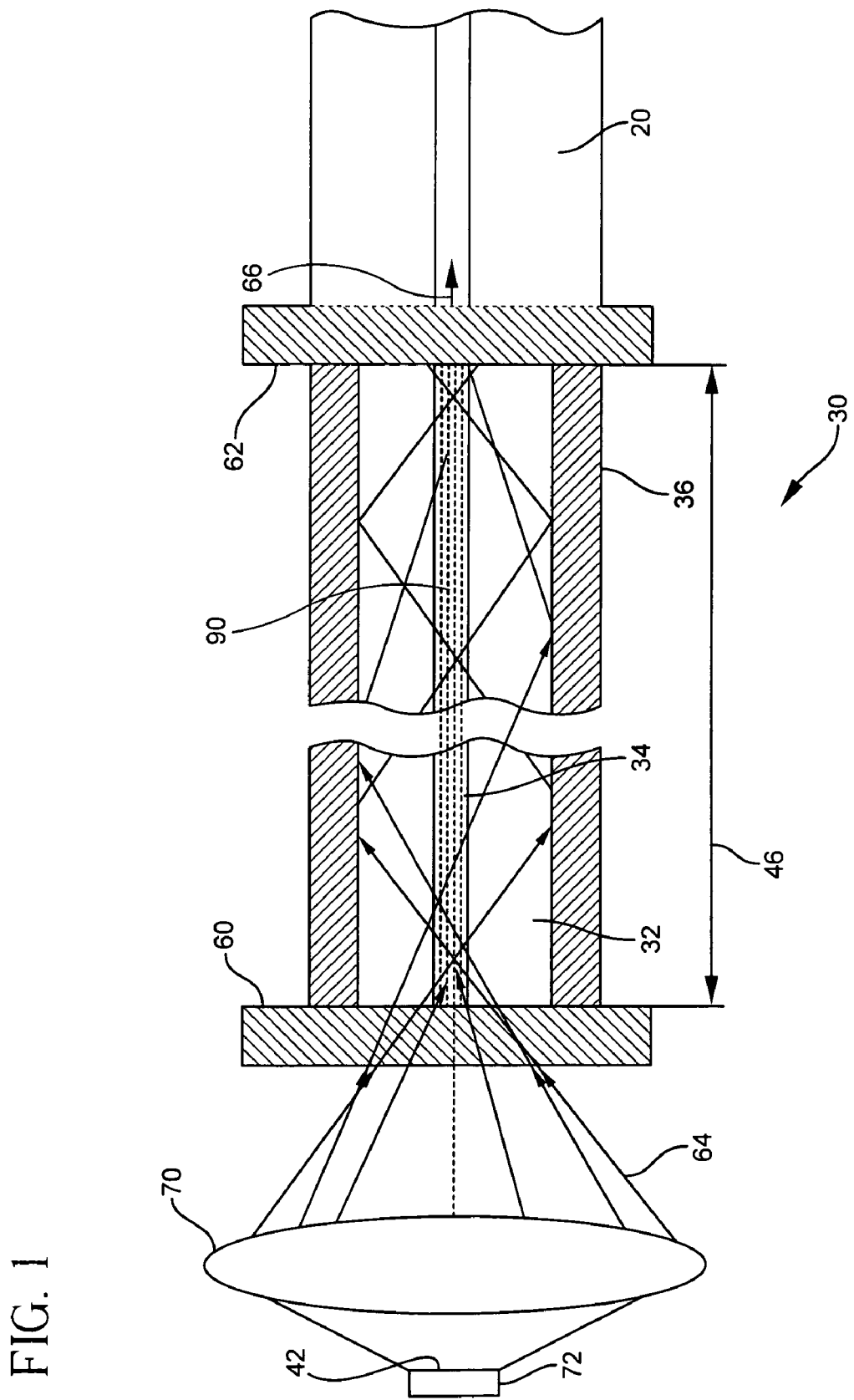
FIG. 1 is a schematic view of a system including a single polarization optically active optical fiber being optically coupled to an optical component, such as an active pumping source 42, for use as a fiber laser, or used as the active pumping source 42 itself for use as an amplifier, in accordance with the present invention.

A plurality of active dopants 90, as seen in FIG. 1, are disposed in a portion 34 of the linearly birefringent and linearly dichroic optical waveguide 30 for providing operation of the waveguide in an operating wavelength range 650 having a center operating wavelength wherein the single polarization wavelength center wavelength is sufficiently close to the center operating wavelength such that the operating wavelength range overlaps the single polarization wavelength range 48. Even though the single polarization wavelength range 48 is shown narrower for the specific application of a Yb-doped fiber laser where gain 650 of FIG. 6 occurs from 1020 to 1100 nm, in general the operating wavelength range 650 can be broader or narrower than the single polarization wavelength range 48. Ideally, the center wavelength of the operating wavelength range 650 should be coincident with the center wavelength of the single polarization wavelength range 48, however, the center wavelengths can be sufficiently close to each other that these two wavelength ranges 650 and 48 overlaps at least at the operating wavelength of an output signal 66 of FIG. 1 of the optically active linear single polarization device. Hence, the optically active linear single polarization device is forced by waveguide design parameters to oscillate or amplify within the single polarization wavelength range 48.

As used here, the term "linearly birefringent" means that the two principal states of propagation of the medium in question are linearly polarized and that such two linear states of polarization have different effective real part (refractive index) of the propagation constants. The additional limitation of "linearly dichroic" means that the states of polarization also have different imaginary part (loss) of the propagation constant.

Propagation constant is the logarithmic rate of change, with respect to distance in a given direction, of the complex amplitude of any field component for an electromagnetic field mode varying sinusoidally with time at a given frequency. The real part of the axial propagation constant for a particular mode is called the attenuation constant. The attenuation coefficient for the mode power is twice the attenuation constant.

Polarization in general is defined with respect to light radiation, and describes the restriction of the vibrations of the magnetic or electric field vector to a single plane. In a beam of electromagnetic radiation, the polarization direction is the direction of the electric field vector (with no distinction between positive and negative as the field oscillates back and forth). Near some given stationary point in space the polarization direction in the beam can vary at random (unpolarized beam), can remain constant (plane-polarized or linearly polarized beam), or can have two coherent plane-polarized elements whose polarization directions make a right angle. In the linear polarization case, a light beam whose electric vectors all vibrate in a single fixed plane. In the two coherent plane-polarized case, depending on the amplitude of the two waves and their relative phase, the combined electric vector traces out an ellipse and the wave is said to be elliptically polarized. Elliptical and plane polarizations can be converted into each other by means of birefringent optical systems.

Birefringence in general refers to the separation of a light beam, as it penetrates a doubly refracting object, into two diverging beams, commonly known as ordinary and extraordinary beams, along the fast and slow axis.

Dichroism is defined with reference to anisotropic materials, as the selective absorption of light rays that vibrate in one particular plane relative to the propagation axes of the waveguide. Those rays that vibrate in a plane at right angles thereto are not absorbed. Anisotropic describes a substance that exhibits different properties along different axes of propagation or for different polarizations of a traveling wave.

Polarization dependent loss (PDL) then is the loss in the linearly birefringent and linearly dichroic waveguide that varies as the polarization state of the propagating wave changes in the waveguide and is expressed as the difference between the maximum and minimum loss in decibels.

"Highly birefringent", "polarization preserving", "polarizing fiber" (PZ) or "polarization asymmetric" refer to a polarization maintaining (PM) fiber of which "linearly birefringent and linearly dichroic" waveguides is a subset. In general any highly birefringent fiber is also polarization maintaining. For linear birefringence one measures the so called "beat length" of the fiber and for linear-dichroism one measures the PDL of the fiber.

Highly birefringent is another name for polarization maintaining or polarization preserving. In a birefringent material, the index of refraction varies with the direction of vibration of a lightwave. That direction having a low refractive index is the fast axis; at right angles to it is the slow axis, with a high index of refraction. A polarization preserving or maintaining (PM) fiber is defined as a single-mode fiber that preserves the plane of polarization of the light launched into it as the beam propagates through its length. The polarization is maintained by introducing polarization asymmetry in the fiber structure, either in its shape (geometrical birefringence) or in its internal stresses (stress-induced birefringence). Because of this asymmetry, the two perpendicularly polarized modes transmitted by the fiber have different propagation constants, reducing cross-coupling between them as compared with conventional single-mode fiber. In polarization-preserving or polarization-maintaining optical fibers, the element used to induce birefringence is called the stress-applying-part (SAP). The SAP is highly doped to provide a different coefficient of expansion from the rest of the fiber material; when the drawn fiber cools, the SAP causes a residual stress that limits cross coupling between the two perpendicularly polarized modes transmitted by the fiber. The SAP can be configured as an elliptical or rectangular cladding surrounding the fiber core, or pairs of SAPs may be placed on either side of the core.

Hence, the PM or PZ fiber has to have sufficient polarization dependent loss (PDL) over the single polarization wavelength range or window 48 to be considered an acceptable linearly birefringent and linearly dichroic waveguide such that the loss of the second polarization mode 50 is zero, and the loss or attenuation of the first mode 45 is 3 dB at the first cut-off wavelength. The loss of the second mode 50 is 3 dB at a wavelength denoted as the second cut-off wavelength. For wavelengths in the range 48 between the first and second cut-off wavelengths, the first mode experiences a loss substantially larger than 3 dB, whereas the second mode 50 experiences a loss less than 3 dB. The wavelength range 48 is called the single polarization wavelength window.

In accordance with the teachings of the present invention, by designing the waveguide parameters of such a linearly birefringent and linearly dichroic waveguide, as represented by the fiber 30, for operation in an operating wavelength range 650 that coincides or otherwise overlaps the single polarization range 48, a linear single polarization device results. Single-polarization should be understood as linear single-polarization everywhere in the present invention and PZ or PM fiber shall mean both linearly birefringent and linearly dichroic going forward when referring to the fiber 30 for simplicity.

A doubly clad or dual clad fiber is an optical fiber that exhibits wide transmission bandwidth and low bending loss to reduction of guided modes as a result of the high-refractive index external cladding and the tight confinement within the core regions. As one possible embodiment, a double clad linearly birefringent and linearly dichroic fiber can be used to form the linear single polarization device.

The linear single polarization device that results is an optically active linearly birefringent and linearly dichroic fiber itself, or its incorporation into a laser or an amplifier, as the most common applications of brightness conversion.

As is known, LASER is the acronym of light amplification by stimulated emission of radiation. A laser is a cavity, with plane or spherical mirrors at the ends, that is filled with lasable material. This is any material—crystal, glass, liquid, dye or gas—the atoms of which are capable of being excited to a semistable state by light or an electric discharge. The light emitted by an atom as it drops back to the ground state releases other nearby, excited atoms, the light being thus continually increased in intensity as it oscillates between the mirrors. If one mirror is made to transmit 1 or 2 percent of the light, a brilliant beam of highly monochromatic, coherent radiation is emitted through the mirror. If plane mirrors are used, the beam is highly collimated. With concave mirrors, the beam appears to emerge from a point source near one end of the cavity.

Optical pumping is the process whereby the number of atoms or atomic systems in a set of energy levels is changed by the absorption of light that falls on the material. This process raises the atoms to specific higher energy levels and may result in a population inversion between certain intermediate levels. Within a laser, the material that emits coherent radiation as a result of stimulated electronic or molecular transitions to lower energy state is called the lasing medium or active laser medium.

Fluorescence is the emission of light or other electromagnetic radiation of longer wavelengths by a substance as a result of the absorption of some other radiation of shorter wavelengths, provided the emission continues only as long as the stimulus producing it is maintained. In other words, fluorescence is the luminescence that persists for less than about $10^{-8}$ s after excitation.

A fiber laser is a laser in which the lasing medium is an optical fiber doped with low levels of rare-earth halides to make it capable of amplifying light. Output is tunable over a broad range and can be broadband. Laser diodes can be used for pumping because of the fiber laser's low threshold power, eliminating the need for cooling.

When a singly-clad or doubly-clad linearly birefringent and linearly dichroic fiber is optically pumped in one possible embodiment of the fiber laser, the emission of light or other electromagnetic radiation of longer wavelengths in the operating wavelength range 650 by fluorescence, as a result of the absorption of some other radiation of shorter wavelengths from the optically-active dopant, can be used to form a singly-clad or a dual-clad linear single polarization fiber laser or amplifier.

The operating wavelength range 650 in FIG. 6 is called the gain curve or gain bandwidth for a laser or an amplification curve for an amplifier. In general, gain or amplification is the increase in a signal that is transmitted from one point to another through an amplifier. The material that exhibits gain rather than absorption, at certain frequencies for a signal passing through it, is known as an active medium. The active medium, in both amplifiers and lasers, is the medium in which stimulated emission rather than absorption of light probably will take place at a given operating wavelength. The medium must have a condition known as population inversion; that is, at least one quantum transition for which the energy level is more densely populated than the lower state.

Hence, a singly-clad or doubly-clad linearly birefringent and linearly dichroic fiber 30 could have an elliptical core and be doped with Er ions 90 of FIG. 1 and designed to operate in the single polarization wavelength range 48 of the amplifier to form a single-polarization Er-doped fiber amplifier. Even though the single polarization wavelength range 48 and overlapping operating wavelength range or gain bandwidth 650 are shown with specific wavelengths for the Yb fiber laser, it is appreciated that these ranges can be applied across other operating and overlapping single polarization wavelength ranges. Specifically, the single polarization fiber laser can be implemented as a 3-level laser, a 4-level laser, or even an in-band quasi-three level laser for eye-safe operation in the 1.5 micron spectrum with an Er dopant. For 1060 to 1080 nm 4-level Yb lasing, either pumps at about 920 nm or 980 nm can be used.

The singly-clad or doubly-clad linearly birefringent and linearly dichroic optical fiber 30 would be used to amplify an optical input in the operating wavelength range 650. The erbium rare earth ions 90 of FIG. 1 are added to the fiber core material as a dopant in typical levels of a few hundred parts per million. The fiber would then be highly transparent at the erbium lasing wavelength of two to nine microns. When optically pumped by a laser diode, optical gain is created, and amplification occurs in the operating wavelength range.

Even though single clad or dual clad-pumped fiber lasers or amplifiers, whether for the usual four-level transition or the more complicated three-level transition are known, a linear single polarization dual-clad fiber laser or amplifier was not known, until the present invention.

All dual-clad fiber lasers have the property that pump light propagating in the inner-cladding, which is linearly polarized at launch, rapidly depolarizes upon a few meters of propagation. This makes it impossible to have single-polarization oscillation by pump-induced polarization-dependent gain. Thus means for introducing PDL are needed. Increasing the doping level (i.e. increasing the fiber core refractive-index delta) only increases the single-polarization window, not the polarization dependent loss (PDL) of the fiber. What is needed is high birefringence and asymmetry, which in a dual-hole fiber of FIG. 2 comes from the elliptical core shape and the hole or aperture positioning. In other designs it may come from an asymmetric depressed cladding, for example.

Referring to FIG. 1, the optically-active fiber, brightness converter, fiber amplifier, fiber laser, dielectric waveguide laser or amplifier of the present invention is shown in FIG. 1 and is generally described and depicted herein with reference to several exemplary or representative embodiments with the same numbers referenced to the same or functionally similar parts. In general, a double-clad structure that could be used as a fiber laser or as an amplifier includes two claddings 32 and 36. A first (inner) multi-mode clad 32 acts as a multi-mode pumping core. The first cladding or clad 32 is adjacent to a single mode core 34, and a second clad 36 surrounds the first clad 32. The first multi-mode clad or inner cladding 32 serves as a waveguide with a high numerical aperture ($NA_{clad}$), preferably within a range of about 0.2 to 0.5, inclusive, for the input pumping light 64 coupled by optional optics, such as a lens 70 from an active pumping source 72. It is known that a duplicate fiber laser could serve directly as the pumping source 72 to form an amplifier without the lens 70 because the fibers would be efficiently mode-matched with their similar dimensions.

Figure 3:
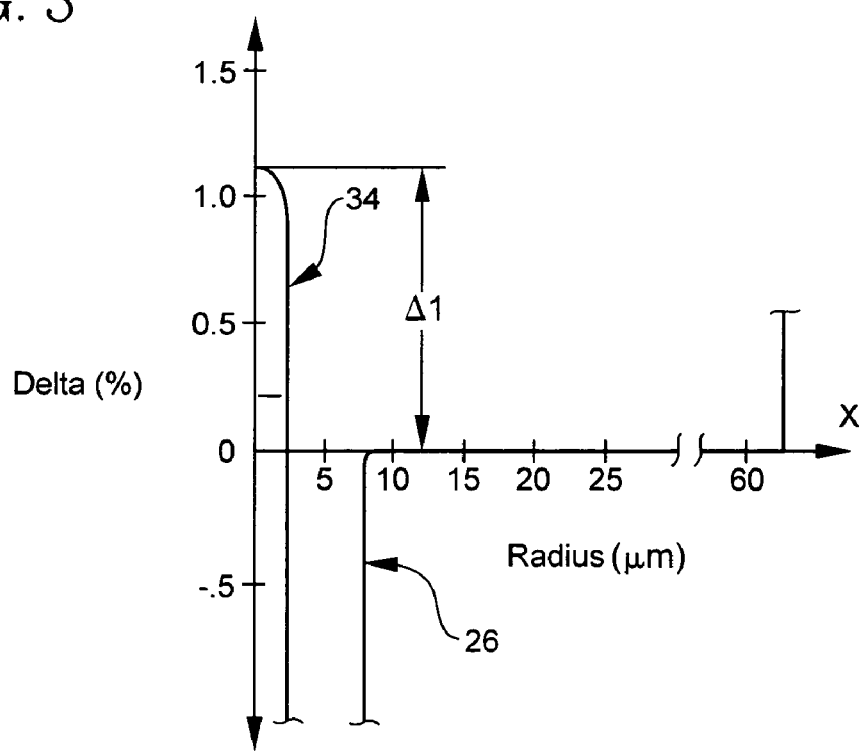
FIG. 3 is a diagram of the refractive index profile of the first embodiment taken along the axis X-X of FIG. 2, in accordance with the present invention.

The cross-section of the first multi-mode clad ($D_{clad}$ is the longer dimension A' of the inner cladding as seen in FIG. 3) may be designed to have a desired shape, e.g., matched to the near field shape of the pump source 72 ($D_{laser}$ is the size of the broad-area laser light emitting aperture 42) or any other scheme or shape which increases coupling efficiency of the pump beam 64. The numerical aperture ($NA_{clad}$) between the first and second clad layers must be large enough to capture the output 64 of the pump laser diode 72. The actual increase in brightness realized depends on the clad to core ratio (CCR) of the pump cladding area to the core area, with the higher the ratio (CCR), the greater the brightness increase. However, this disparity in area between the core and cladding cross-sections necessitates a long device length, since the absorption of the pump radiation is inversely proportional to this ratio (CCR). Conventionally high ratio (CCR) of pump cladding area to core area renders achieving a high level of inversion difficult for 3-level lasing but not much an obstacle for 4-level lasing, because in general the higher the ratio (CCR), the lower the level of inversion that can be achieved with a given pump power. Hence, pump absorption and inversion are related.

Using rare-earth elements, such as Er, Yb or Nd as the dopant 90 in the core 34 of the double-clad fiber amplifier/laser with high clad to core ratio (CCR) is thus problematic. Even with the very high power available from a diode laser bar, it is very difficult to reach the high level of inversion necessary for the operation of a 3-level system for lasers or amplifiers.

Three-level transitions require a high inversion of >50% in order to experience gain. Quasi-three-level transitions require lower, but significant inversion levels as compared to four-level lasers, which experience gain for infinitesimally small inversion. Ytterbium and neodymium ions ($Yb^{+3}$ and $Nd^{+3}$) provide a three-level lasing system at around 980 nm and a quasi-three-level lasing system at around 940 nm, respectively. In a three-level system, lasing occurs from an excited level to either the ground state or a state separated from it by no more than a few kT (that is, thermally mixed at operating temperature). As a result, an unpumped doped core strongly absorbs at the laser wavelength, and the lasing power threshold can become a problem because of insufficient population inversion.

In the competing and higher-gain four-level-transition case, for example, at about 1060 nm for neodymium (Nd), the doped core is still transparent at the laser signal wavelength when not being pumped. As a result, the power threshold for lasing depends essentially on the dimensions of the doped core and the inner cladding of a double-clad fiber structure, and the background loss in the double-clad fiber over the pump absorption length.

Likewise, even though $Yb^{3+}$ ions exhibit gain in a narrow 6 nm-wide pure three-level transition at 976-978 nm to show much promise of ytterbium as a pump for high-powered EDFAs, an efficient Yb 976 nm fiber laser has not been realized yet because of Yb's other competing and higher gain transition that peaks at about 1030 nm (but extends as far as 1120 nm), which is a broad quasi-four-level transition that requires a population inversion of only a few percent for transparency. Hence, the reason 980 nm (or close to 976 nm) lasing is difficult to achieve is because a high inversion level is required (>50%) for the 976 nm transition which means that the power laser threshold is also high. Furthermore, sufficient inversion is hard to achieve at about 976 nm because the competing quasi-four-level transition at about 1015-1030 nm for Yb produces the amplified spontaneous emission (ASE), which saturates the inversion.

The inversion problem stems from the relationship between the gains in the two competing transitions and the pump absorption for Yb. As a representative example, the gains at the two wavelengths in a Yb-doped germano-alumino-silicate glass (assuming homogeneous broadening) are related by the equation:

$$G_{1030} = 0.25 G_{976} + 0.74 \alpha_P \frac{\Gamma_S}{\Gamma_P} \qquad (1)$$

where $G_{1030}$ and $G_{976}$ are the gains at 1030 nm and 976 nm, respectively, $\alpha_P$ is the partially-bleached pump absorption in decibels (dB), and $\Gamma_S$ and $\Gamma_P$ are the respective overlap factors of the signal mode and pump mode with the dopant profile.

Similar relationships with different coefficients will hold for other hosts, such as antimony silicate glass. As is known, double-clad fibers allow coupling from diode bars and other similar active structures. However, this is conventionally accomplished by a greatly-reduced pump overlap with the doping profile relative to the signal overlap, since the doping needs to be confined in or close to the signal core in order to obtain sufficient optical gain for the core mode at the signal wavelength. Typically, the core is uniformly doped, and the area ratio (CCR) between the pump waveguide and the signal core is on the order of 100:1 for conventional double-clad fiber lasers. As a result, $\Gamma_S=1$ and $\Gamma_P<0.01$. Using these values in Equation (1), each 1 dB of pump absorption produces about 20 dB of gain at 1030 nm. Similarly, for an overlap ratio of $\Gamma_S/\Gamma_P=50$, each dB of pump absorption would result in the gain at 1040 nm growing by as much as 36 dB.

Inevitably, the higher gain of competing transitions leads to a high level of amplified spontaneous emission (ASE), which saturates the inversion. Even with weak pumping, ASE at 1030 nm will saturate the amplifier and deplete or otherwise prevent a buildup of the population inversion necessary for lasing at 976 nm. In fact, even without an optical cavity, lasing at the longer four-level wavelength is possible from just the backscattering. Hence, high pump absorption will favor gain at 1030 nm or longer even if the laser mirrors, defining the cavity, are tailored to 976 nm.

Thus, in quasi-three-level or three-level cladding-pumped fiber lasers, poor overlap of the pump power spatial distribution with the doped area results in a much higher gain of competing four-level laser transitions that require relatively low inversion levels (<5%). It is therefore necessary to suppress the gain of these competing transitions in order to achieve the desired three-level or quasi-three level oscillation at the inversion level required.

Because making the fiber length long enough for a fixed pump power is equivalent to decreasing the average inversion, one prior approach intentionally made the fiber laser length short enough to avoid lasing at the quasi-four level transition at about 1030 nm but to preferentially lase instead at 980 nm. However, a short fiber laser is inefficient.

In accordance with the teachings of the present invention, in the specific case of an Yb 3-level transition at 980 nm, Equation (1) can be used to estimate the desired overlap ratio of $\Gamma_S$ and $\Gamma_P$ which is closely related to the area ratio (CCR)

of the inner cladding area over the core area ($A_{clad}/A_{core}$). For Yb, given that an absorption of at least 6 dB of pump is desired, and the inability to suppress more than forty extra dB of gain at the competing quasi-four-level transition at 1030 nm, then using Equation (1), the desired $A_{clad}/A_{core}$ can be calculated. For the preferred silicate host glass the desired clad-to-core ratio ($A_{clad}/A_{core}$) is thus found to be less than eight for an Yb double-clad fiber laser.

Hence, for making a single polarization fiber laser or the amplifier, an optically active polarizing (PZ) fiber 30 is specially designed for optimum double-clad three or four level lasing single polarization operation. For the more difficult three-level design, the double-clad structured active fiber 30 has the doped central part or core 34, doped with an optically excitable ion 90 having a three-level transition or any other type of ion requiring a high level of inversion. The core 34 has a core refractive index ($n_{core}$) and a core cross-sectional area. The cross-sectional area can be calculated from the dimensions A and B of the core 34. The inner cladding 32 surrounds the core 34 and has an inner cladding refractive index ($n_{innerclad}$), less than the core refractive index, an inner cladding cross-sectional area between 2 and 25 times greater than that of the core cross-sectional area (2<CCR<25), and an aspect ratio greater than 1.5:1. This preferred design and dimensions of the double-clad active fiber 30, allows strong pump absorption, greater than 6 dB, while suppressing long wavelength $\lambda$SE. The inner cladding cross-sectional area can be calculated from the dimensions of the inner cladding, which includes a longer dimension A', as taught by the present invention and can be exemplified by FIG. 3.

Referring back to FIG. 2, the outer cladding 36 surrounds the inner cladding 32 and has an outer cladding refractive index less than the inner cladding refractive index.

An example of an Yb fiber laser, using the fiber 30, for operation at 1060 nm would be a simpler implementation of a quasi 4-level laser then the more complicated 3-level laser. In contrast to operating as a 3-level laser, when operating as a four-level laser, there should be no restrictions at all on the inner clad to core area ratio (CCR).

However, for the more difficult use of the active PZ fiber 30 with the optically excitable ion Yb having a three-level transition, cavity and fiber optimizations have to be implemented. On the pumped end of the active fiber 30, a 100% signal reflective and pump transparent mirror 60 is placed. Signal reflection of about 4% is provided on the output end, with an optional output mirror 62. Neglecting waveguide loss, 9976=7 dB. It is desired to absorb at least 6 dB of pump power, but not more than 40 dB of 1040 nm gain can be suppressed by wavelength selective feedback. After substituting these values into Equation (1), the preferred clad-to-core area ratio or overlap ratio of $\Gamma_S/\Gamma_P$ can be found, and a maximum ratio of 7.6 is found for the rare-earth dopant Yb for use in an Yb fiber laser at 980 nm.

The optically excitable ion 90 could be one or more of the transitional metals, such as chromium, in addition to being one of the rare-earth elements. If an element such as Ge, P, or B is used to provide Raman gain in a fiber, then the optically excitable ion is any suitable rare-earth element for use as a double-clad fiber laser for pumping the fiber with Raman gain.

In general, the active fiber 30 can be used as an amplifier or fiber laser. For all rare-earth dopants 90 as the optically excitable ions, such as Er, Nd, Tm, and Yb, especially those requiring a high level of inversion, the present invention teaches a maximum allowable inner cladding area for the double-clad structure. Generally, given the pump absorption cross-section ($\sigma_{ap}$), the metastable level lifetime ($\tau$) and the desired level of average inversion ($\bar{n}_2$), and the available pump power from any type of a laser diode such that assuming a particular power absorption, input and output (unabsorbed) pump power values can be estimated as $P_{in}$ and $P_{out}$, respectively, the maximum permissible cross-sectional cladding area can be found using the following equation, as taught by the present invention for any rare-earth and host material system:

$$A_{clad} \leq \frac{\sigma_{ap}\tau(1-\bar{n}_2)(P_{in}-P_{out})}{h\nu\bar{n}_2\ln(P_{in}/P_{out})} \quad (2)$$

where h$\nu$ is the pump photon energy.

Despite all the differences between ions and host materials, Equation (2) is universally applicable, and especially suited for amplifiers operating well below saturation. In the classical case of the active fiber 30 used as a conventional or C-band silica-glass Er-doped amplifier (EDFA) operating at 1530-1565 nm, $A_{clad}$<780 um$^2$ is taught by the present invention by substituting corresponding values in Equation (2). Hence, in general, it is not the clad-to-core ratio (CCR), but the absolute size of the inner cladding that is most critical for efficient laser or amplifier operation. Accordingly, the core 34 can be any size that fits inside the inner cladding 32. However, it is preferable that the core 34 is similar in size and NA to standard single-mode fibers 20, which would facilitate coupling to the output fiber 20 for the laser or amplifier. With the typical single-mode core radius of 3 to 4 um, a clad-to-core area ratio CCR ($A_{clad}/A_{core}$) of 10:1 to 20:1 for the C-band Er case can be derived.

In this example, the double-clad fiber amplifier is based on silica glass codoped with Ge and Al (type II) and pumped at 980 nm ($\sigma_{ap}$=2.55×10$^{-25}$ m$^2$, $\tau$=8 ms, h$\nu$=2.03×10$^{-19}$ J). A single 2W laser diode is used to pump the amplifier. Given this 2W available power of the laser diode, 80% of the available power ($P_{in}$=1600 mW) is coupled into the inner cladding. No more than half of that power escapes on the other end ($P_{out}$=800 mW) given the desired power efficiency of the fiber amplifier. For type II C-band amplifiers, an average inversion ($\bar{n}_2$) of ~0.6 is needed to achieve a minimal gain "ripple" (gain variation within a useful amplification band). Substituting these values into Equation (2), the cross-sectional area of the inner cladding is found: $A_{clad}$≈780 $\mu$m$^2$. What this means is that for an inner cladding cross-sectional area larger than 780 square microns, an average inversion of 0.6 will not be achievable unless a more powerful pump laser (more available power than 2W) is used. In practice, passive losses will limit the useable size of the inner cladding to even lower values, of an order of 500 $\mu$m$^2$ or less.

Using a typical core radius of a=3 $\mu$m, the clad-to-core area ratio CCR is $A_{clad}/A_{core}$=500/($\pi$·3$^2$)≈18, which is well below values recommended in prior references or ever reported for working double-clad lasers and amplifiers.

Hence, for a C-band Er-doped double clad amplifier pumped with a 2 W 980 nm broad-area laser diode, recommended values, in accordance with the teachings of the present invention, for the clad-to-core area ratio are 10:1 to 20:1, but in any case, the cross-sectional area of the inner cladding should not exceed 500 $\mu$m$^2$. If the available power is doubled in the laser diode as in a 4 W pump diode, recommended values are then also doubled such that the clad-to-core area ratio range is now 20:1 to 40:1 and the inner cladding area is now less than 1000 $\mu$m$^2$.

For amplification in a long wavelength or L-band amplifier operating between 1570 nm and 1620 nm, significantly smaller values of the average inversion, such as around 0.4, are needed. Corresponding to a lower inversion, the maximum useable cross-sectional area of the inner cladding is at least 2.5 times larger than the case of a C-band amplifier. A double clad L-band amplifier pumped by a 1.76 W 980 nm laser diode module with the inner cladding cross-sectional area of 2100 µm² has been demonstrated. However, the amplifier efficiency was only ~15%, owing to its circular inner cladding geometry and its small pump absorption. Smaller inner cladding sizes are advantageous for L-band as well as for C-band amplification, since higher levels of pump absorption can be allowed for the same average inversion. Hence, for an L-band Er-doped double clad amplifier pumped with a 2 W broad-area laser diode, recommended values for clad-to-core area ratio CCR are 10:1 to 50:1 and the cross-sectional area of the inner cladding should not exceed 2000 µm².

If the Yb fiber laser provided by the active fiber 30 is pumped with a single 2 W broad-area laser diode 72 and the input pump power $P_{in}$=1600 mW is actually launched in the inner cladding 32, for efficient laser operation, the threshold power required for lasing should not exceed about a quarter of the input pump power, or 400 mW. Taking $\alpha_p$=6 dB, hv=$2.16 \times 10^{-19}$ J (for a 920 nm pump), $\sigma_{ap}$=$8.3 \times 10^{-21}$ m², τ=0.8 ms and $P_{th}$=0.4W, the cladding area is $A_{clad}$=890 µm² from Equation (4). Hence, for a Yb doped 976 nm double clad fiber laser pumped with a 920 nm broad-area laser diode, the recommended values for clad-to-core area ratio are 2:1 to 8:1 from Equation (1) and the cross-sectional area of the inner cladding should not exceed 900 µm² from Equation (4) because the threshold should be decreased as much as possible.

A double-clad fiber with such a small clad-to-core area ratio is realizable. For an 8 µm diameter circular core within a preferred 10×30 µm elliptical inner cladding, the area ratio is equal to $(5 \cdot 15/4^2) \approx 4.7$ which is less then the maximum taught ratio of 8 for Yb.

The preferred design and dimensions of the double-clad active fiber 30, allows strong pump absorption while suppressing long wavelength ASE and allows a strong enough pump intensity to obtain 3-level operation. For example, the input side of a 3-level or a quasi-3-level double clad active fiber or brightness converter 30, for use as an amplifier or a laser, is irradiated with the pump signal 64 at wavelength $_p$. The preferably-single-transverse-mode core 34, centrally located within the multimode inner cladding 32, is made from glass having a sufficient compositional difference from the inner cladding 32 to provide the appropriate differences in refractive indexes. The core 34 does not have to be strictly single mode, a core on the border of being 2-moded still works. Preferably for high power lasing, the core 34 is doped with ytterbium ($Yb^{3+}$), erbium ($Er^{3+}$) or neodymium ($Nd^{3+}$) ions, but other rare-earth elements 90 can be used. The double-clad active fiber 30 also includes an outer cladding 36 that is preferably made of a glass with a lower refractive index than the refractive index of the inner cladding 32 such that the $NA_{clad}$ is greater than 0.3. An all-glass design allows these types of refractive indexes and the glass types include lanthanum aluminosilicate glasses, antimony germanates, sulfides, lead bismuth gallates, etc. A preferred material for the overclad is also a glass, for example, an alkali of boroaluminosilicate.

No attempt has been made to accurately illustrate their relative diameters in the cross-sectional area representations of the active PZ fiber 30 in FIG. 3, 6, 7, or 8. However, the area of the inner cladding 32 is preferably approximately less than twenty-five times larger than the area of the core 34. Also, it is possible to use air (n=1) as the outer cladding to provide a single-clad single polarization laser or amplifier.

The length of the active fiber 30 is relatively unimportant beyond its being very long compared to the wavelengths involved so that any higher-order modes are adequately attenuated over its length. In practice, this length is determined by the level of rare earth doping in the core and desired pump absorption efficiency. In some circumstances 1 cm in length is more than adequate.

The active PZ fiber 30 includes two mirrors 60, 62 defining the input and output ends respectively of the optical cavity 46 and to serve as end reflectors. The input mirror 60 is made highly transmissive to an optical pump signal 64 at the pump wavelength $\lambda_P$ and highly reflective at the signal (lasing) wavelength $\lambda_S$ of the output signal 66 while the output mirror 62 is made partially reflective (partially transmissive) at the signal wavelength $\lambda_s$ and preferably also at least partially reflective at the pump wavelength $\lambda_P$. For the active fiber 30 used as a fiber laser, it is possible to use a cleaved output facet as the output mirror 62. Even its 4% reflectance across an air gap to a butt coupled output fiber 20 is sufficient to define the optical cavity.

The single-mode fiber 20 is butt coupled to the output end of the core 34. If the brightness converter or fiber laser 30 is being used as a pump source for an EDFA or other doped optical amplifier, such as a Raman amplifier or fiber with Raman gain, the single-mode fiber 20 is the pump fiber for coupling the active pumping source to an amplifying fiber. Thereby, the pump signal 64 is efficiently admitted into the optical cavity 46 at the input mirror 60. The optical cavity 46 is defined between the mirrors 60, 62, and some of the standing wave in the optical cavity is allowed to pass through the output mirror 62.

For the ytterbium fiber laser provided by the active fiber 30 for the three-level lasing example, the signal wavelength $\lambda_S$ equals 978 nm corresponding to the three-level $Yb^{3+}$ transition. Although the invention, where it concerns fiber lasers, is developed in view of $Yb^{3+}$ doping, it is not so limited. The fiber laser or brightness converter 30 may be doped with other transitional or rare-earth ions 90, such as $Nd^{3+}$. A combination of Yb and Nd doping, either by co-doping or by a sequence of differently doped fibers allows pumping at 800 nm rather than 920 nm.

Instead of using a separate focusing element 70, the optical characteristics of the broad stripe laser 72 may be good enough to allow direct coupling into the multi-mode inner cladding 32. However, if a focusing element 70 is needed, techniques have been developed that enable efficient coupling of pump power from broad-area laser diodes having typical emitting apertures with dimensions of 100×1 ρm² and NA's of 0.1/0.55 in the slow and fast axes, respectively, into a fiber with a rectangular core cross section of 30×10 µm² and effective numerical aperture of >0.42. The terms "slow" and "fast" refer to the planes that are "parallel" and "perpendicular," respectively, to the laser diode junction plane. In order to efficiently couple light from the broad-area semiconductor laser 72 with emitter dimensions of 100×1 µm² and NA's of 0.1/0.55 in the slow and fast axes (measured at 5% of the maximum far-field intensity points), respectively, coupling optics or other beam shapers 70 can be designed to produce an image of the emitter near field with dimensions of 30×10 µm² and 5% NA's of 0.35/0.12 in the slow and fast axes, respectively.

Regardless of direct coupling or not, the pump signal may be provided by a laser diode 72, in the form of AlGaAs or InGaAs broad stripes, arrays, a diode bar emitting at a wavelength shorter than 976 nm but within the ytterbium absorption band, or a multiplexed coupling of other fiber lasers or stacked diodes. The practical pump band extends from 850 to 970 nm with a more preferred range being 910-930 nm and a most preferred range being 915-920 nm. The precise values of these bands and the lasing wavelength may shift by a few nanometers depending upon the dielectric host.

In accordance with the teachings of the present invention, the input mirror 60 is a narrow band filter and preferably a Fiber Bragg grating (FBG) having a narrow bandwidth centered with a single polarization bandwidth (SPB) 48 of FIG. 6 of the PZ active fiber 30. To use the bandwidth limitation (for example via FBG's) of the input mirror 60 to achieve single-polarization oscillation or lasing in a double-clad fiber laser, a PZ fiber 30 with moderate birefringence ($10^{-4}$ to $10^{-6}$) is preferred. A fiber oscillator of the right length, as is known, and with the right magnitude of birefringence (and no or low dichroism) from stress induced or geometrically induced regions (such as asymmetrically depressed claddings) of the PZ fiber 30 is designed to have a wavelength-dependent output state of polarization under its gain bandwidth for the anisotropic fiber 30. With such suitable birefringence or dichroism regions, the resultant PZ fiber 30 with have a polarization dependent loss (PDL) which is sometimes called dichroism. The bandwidth limitation from the input mirror 60 is used to select a specific single-polarization of the PZ fiber 30.

This gain bandwidth limitation of the invention is particularly important for high power operation of single-polarization fiber lasers. Taking the dual-hole fiber design of FIG. 2, for example, most rare-earth transitions have a gain bandwidth which is much broader than the single-polarization bandwidth achievable with core-deltas of 0.5 to 1%. One can readily increase the single-polarization bandwidth typically by reducing the core diameter or increasing the delta such as by increasing the doping level of the glass components, such as Germania (Ge), Phosphorous (P), Aluminum (Al), or Boron (B) to change the core NA, but this has the negative effect of reducing the effective area of the fundamental mode. For high power operation one seeks to have the largest effective area for the fundamental mode; one simple way to do this is by reducing the delta and increasing the core radius; however, reducing the delta will reduce also the single-polarization window, thus making it necessary to have a gain-bandwidth limitation that can be selected by a separate grating or other reflector.

Referring back to FIG. 6, a similar plot of the output power spectrum $S_o$ of a Nd-doped fiber laser with a SP fiber 30 having birefringence in the range of $10^{-4}$ to $10^{-6}$ and a length of about 6 m is shown could be easily substituted for the Yb-doped fiber shown as gain bandwidth 650. With either type of rare-earth dopant, a higher gain position for aligning the single polarization bandwidth 48 with the fiber laser's bandwidth 650 can be selected by a fiber Bragg grating embodiment of the input mirror 60 for the high-power fiber laser of FIG. 1 and is described with respect to the output power spectrum, transmission, or spectral intensity of the grating 60. The narrow band filter (F) of the grating 60 of FIG. 1 has a bandwidth (FWHM) less than the gain bandwidth (FWHM) 650 of the fiber laser and the single-polarization bandwidth 48. For a Nd or Yb fiber laser, an optimum filter bandwidth is in the range from 1-30 nm. A key parameter for obtaining a continuous wave is a generated spectral bandwidth 650 of the output signal from a laser or amplifier of FIG. 1, which is larger than the intra-cavity filter bandwidth (F). The generation of high power signals is not limited to Fabry-Perot cavities as shown in FIG. 1, but any waveguide laser cavity design with an intra-cavity waveguide and a narrow bandpass filter can be implemented. In fact, the grating 60 need not be narrow-band and can be a bandpass filter 60' as in FIG. 12 or be any other suitable reflector.

As one example of the SP fiber 30, a first embodiment of the single polarization optical waveguide fiber 30 has a cross-sectional structure, as best shown in FIGS. 2-5. The same configuration exists for the single polarization fiber 30' in FIG. 12, except that the core is not doped with an active ion. In the illustrated embodiment, the actively doped optical waveguide PZ fiber 20 includes the center core 34 extending along the longitudinal axis of the fiber and having a maximum dimension, A, and a minimum dimension, B. The cross-sectional shape of the center core 34 is elongated, and is preferably generally elliptical. Preferably, the elongation would be controlled during fiber processing (draw or redraw) such that the drawn fiber 30 exhibits a first aspect ratio, AR1, defined as A/B, of greater than 1.5; preferably between about 1.5 and 8; more preferably between 2 and 5.

Figure 4:
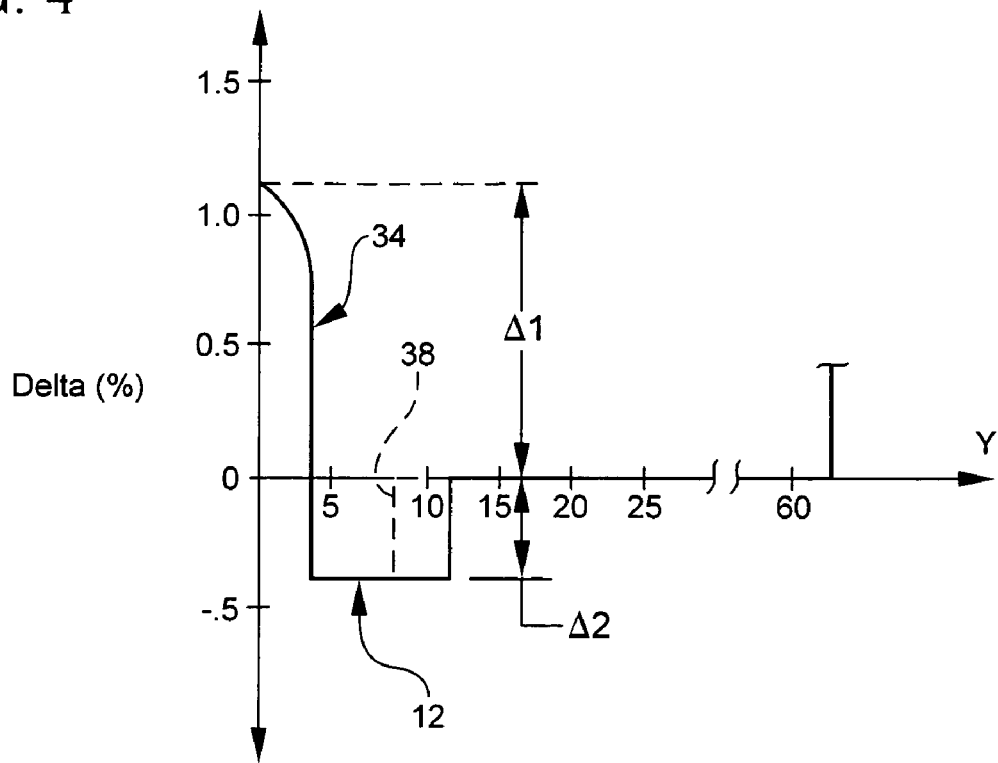
FIG. 4 is a diagram of the refractive index profile of the first embodiment taken along the axis Y-Y of FIG. 2, in accordance with the present invention.
Figure 5:
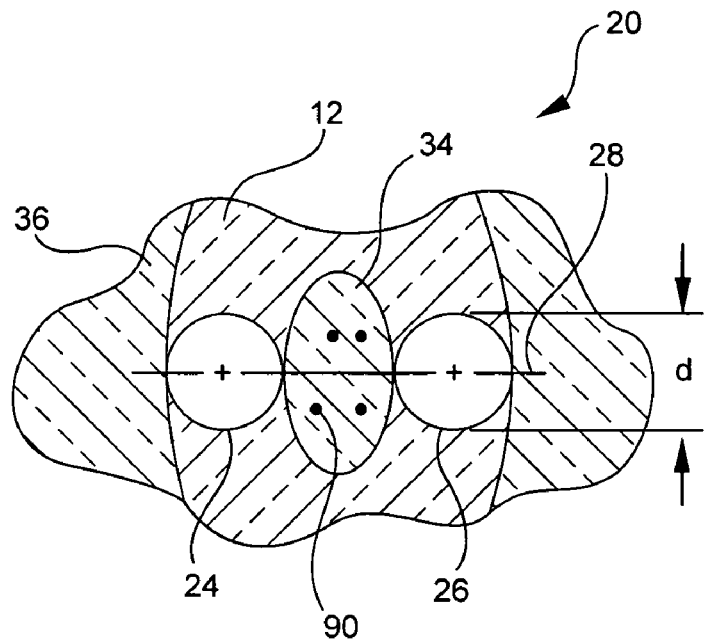
FIG. 5 is an enlarged partial cross-sectional view of the first embodiment of the single polarization optical fiber in accordance with the present invention.

Central core 34 is preferably manufactured from germania-doped silica, wherein germania is provided in a sufficient amount such that the core exhibits a core delta %, $\Delta 1$, as shown in FIGS. 3-4, of between about 0.5% and 2.5%; more preferably between about 0.9% and 1.3%; and in one embodiment about 1.1%. An average diameter, d avg={A+B}/2, of the center core 34 is preferably between about 3 and 12 microns; more preferably between 4 and 10 microns.

It has been discovered that by raising the core deltas %, $\Delta 1$, the single polarization bandwidth 48 (See FIG. 6) can be shifted to longer wavelengths. Conversely, making the diameter of the holes of the dichroism regions 24, 26 smaller, which serve as PDL differentiators, various fiber parameters can be optimized with the smaller holes to lower the single polarization bandwidth 48 to shorter wavelengths. The single polarization bandwidth 48 is located between the cutoff wavelength of the first polarization 45 and the cutoff wavelength of the second polarization 50. Within this wavelength band 48, true single polarization, that is, there is one, and only one, polarization provided. The single polarization bandwidth 48 is measured herein 3 dB down from the linear region 49 of the plot as best illustrated in FIG. 6.

Referring to FIG. 6, as one example, the single polarization bandwidth (SPB) 48 extends between about 1,057 nm and 1,082 nm thereby providing a bandwidth of single polarization of about 25 nm. However, it should be recognized that this range is exemplary and that other wavelength bands for the PZ fiber may be provided. The width of the single polarization region (SPB) may be increased by increasing the core delta and reducing the average core diameter. Likewise, the position of the SPB may be adjusted as described above. Further adjustments may be made to the single polarization fiber to adjust the relative position or width of the SPB 48 (See Table 1 below).

Table 1 below illustrates, based upon modeled calculations, the sensitivity of the cutoff wavelength, $\lambda 1$, of the first polarization, cutoff wavelength, $\mu 2$, of the second polarization, and single polarization wavelength band width, $\Delta\lambda$, of the single polarization fiber to various changes in hole diameter (d); changes in core delta %, $\Delta 1$; changes first aspect ratio, AR1; and changes in the d avg of the central core 34.

TABLE 1

Sensitivity Modeling

| Example # | d (μm) | $\Delta 1$ (%) | AR1 | d avg (μm) | $\lambda 1$ (nm) | $\lambda 2$ (nm) | $\Delta\lambda$ (nm) |
|---|---|---|---|---|---|---|---|
| 1 | 1 | 1.0 | 1.5 | 4 | 1608 | 1577 | 31 |
| 2 | 5 | 1.0 | 1.5 | 4 | 1436 | 1378 | 58 |
| 3 | 10 | 1.0 | 1.5 | 4 | 1358 | 1298 | 59 |
| 4 | 15 | 1.0 | 1.5 | 4 | 1328 | 1267 | 61 |
| 5 | 5 | 1.0 | 3 | 5.6 | 1462 | 1407 | 55 |
| 6 | 10 | 1.0 | 3 | 5.6 | 1344 | 1278 | 66 |
| 7 | 15 | 1.0 | 3 | 5.6 | 1316 | 1246 | 69 |

TABLE 1-continued

Sensitivity Modeling

| Example # | d (μm) | Δ1 (%) | AR1 | d avg (μm) | λ1 (nm) | λ2 (nm) | Δλ(nm) |
|---|---|---|---|---|---|---|---|
| 8 | 5 | 1.0 | 5 | 7.2 | 1262 | 1210 | 52 |
| 9 | 10 | 1.0 | 5 | 7.2 | 1162 | 1103 | 59 |
| 10 | 15 | 1.0 | 5 | 7.2 | 1119 | 1057 | 62 |
| 11 | 5 | 1.0 | 8 | 10.8 | 1265 | 1208 | 57 |
| 12 | 10 | 1.0 | 8 | 10.8 | 1127 | 1064 | 63 |
| 13 | 15 | 1.0 | 8 | 10.8 | 1122 | 1057 | 65 |
| 14 | 5 | 0.5 | 3 | 8.15 | 1582 | 1549 | 33 |
| 15 | 5 | 1.0 | 3 | 6 | 1597 | 1541 | 56 |
| 16 | 5 | 1.5 | 3 | 5 | 1613 | 1533 | 80 |
| 17 | 5 | 2 | 3 | 4.32 | 1624 | 1523 | 101 |
| 18 | 5 | 2.5 | 3 | 3.8 | 1617 | 1496 | 121 |

The above example 1-18 illustrates the sensitivity of the PZ fiber 30 to various structural parameter changes. In particular, it can be seen in Examples 1-4 that by changing the hole diameter from 1 to 15 microns, the single polarization wavelength band may be driven to shorter wavelengths. Examples 14-18 dramatically illustrates how the core delta, Δ1, may be used to broaden the width of the single polarization band. The remaining examples show how the average core diameter, d avg, and aspect ratio, AR1, may be used to influence the single polarization bandwidth and the relative location of that band.

The fiber parameters discussed so far are not the only possible design of the fiber. A passive single-polarization fiber has several design parameters such as the ellipticity of the core, the dimensions of the core, the core delta, the size of the adjacent holes for optimization for different applications. One can design these fiber parameters to achieve differential cut-off wavelengths for desired values. The single-polarization window is the wavelength range between these cut-off wavelengths and hence can also be changed depending on the various fiber parameters. For the application of the active single polarization fiber 30, two applications predominate.

Firstly, for a single-polarization amplifier, the fiber design parameters are designed such that wavelengths to be amplified fall within the single-polarization wavelength region of the single-polarization fiber. If the wavelength to be amplified is larger than both cut-off wavelengths (i.e. if it falls out and above the single-polarization window), there will of course be no amplification as both polarizations are not transmitted. If the wavelength is lower than both cut-off wavelengths, then both polarizations will be amplified and there will not be a single-polarization functionality. As an example, one could have a single-polarization Er-doped fiber amplifier (SP-EDFA) where the elliptical core of the SP fiber would be doped with the active dopant 90 being erbium (Er).

Secondly, for a single-polarization oscillator (laser), one needs to design the fiber parameters such that the gain bandwidth coincides or is narrower than the single-polarization window. If this is not the case, one needs to implement wavelength-selective feedback from the input mirror 60, for example by a fiber Bragg grating with high reflectivity at a Bragg wavelength that falls within the single-polarization window, to make sure that feedback is higher for wavelengths where single-polarization will take place.

For Yb fiber lasers, gain occurs from 1020 to 1100 nm, so the single-polarization (SP) fiber 30 must be designed with a single-polarization window in this range. If the gain is much broader than the SP window 48, a grating 60 having a high reflectivity can be used (although any other wavelength selective filter can also be used) to restrict the gain and provide feedback only over a narrow wavelength region that falls within the SP window 48. High reflectivity in the input mirror 60, preferably a grating, is desired to get enough power from one side of any high gain fiber laser. The other fiber parameters that are preferred are that the core 34 has an elliptical shape to provide a large modal area having a core index delta about 0.15% to provide a numerical aperture about 0.8.

Referring back to FIG. 2, the center core 34 is preferably surrounded by an annular region 12 having a different composition than the center core; preferably being of a refractive index less than the core and sometimes called a depressed cladding. Accordingly, the annular depressed cladding region 12 is preferably down-doped relative to pure silica, and is therefore most preferably manufactured from fluorine-doped silica. Annular depressed cladding region 12 preferably exhibits a delta %, Δ2, as shown in FIG. 4 of between about −0.0% and −0.7%; more preferably between about −0.2% and −0.6%; and most preferably about −0.4%. Generally, the glass in the annular depressed cladding region 12 is doped such that it is more viscous at draw temperatures than is the center core 34. The annular depressed cladding region 12 may also have a generally oval shape as illustrated by core/clad interface 22 of FIG. 2 or, more preferably, a generally circular shape as illustrated by dotted line 38.

In an embodiment having a circular shape, the annular depressed cladding region 12 preferably has an outer diameter, D, of between about 10 to 25 microns; more preferably between about 13-19 microns; and in one embodiment about 16.5 microns. Optionally, the annular depressed cladding region 12 may have a generally elongated shape, such as elliptical. In this case, the average dimension D avg={A'+ B'}/2 is about twice that of the central core 34, for example, between about 6 to 16 microns, and the second aspect ratio, AR2, defined as A'/B', is between about 1.5 and 8.

In addition to the elliptical central core, at least one air hole is formed on opposite sides of the core 34. The holes 24, 26 are preferably formed, at least in a part, in the annular depressed cladding region 12 of the fiber 30. The holes 24, 26 are preferably air or vacuum filled holes and extend along the entire longitudinal length of the fiber 30, and are preferably of substantially constant dimension along the fiber length. The holes 24, 26 are preferably positioned on diametrically opposite sides of the center core 34 and may be entirely or only partially formed in the annular region 12. For example, the holes 24, 26 may be entirely included within annular depressed cladding region 12 or the holes 24, 26 may partially extend into an outer cladding 36 as shown in fiber 30 of FIG. 7. The holes are positioned adjacent to, and aligned with, the minimum dimension B of the center core 34 and in very close proximity thereto (for example, having a hole edge located within 3 microns from the center core 34). Regarding the alignment, the air holes are positioned such that a line 28 (FIG. 5) passing through the center of the holes 24, 26 is substantially aligned with the minimum dimension (B). The holes are preferably circular, but may optionally be of other shapes and may be of equal or non-equal size, and preferably have a maximum dimension, such as diameter d (FIG. 5) of between about 1 to 15 microns; more preferably between about 5 and 11 microns. Although only one hole is shown on each side, multiple holes along each side may also work to cause the elliptical shape and provide single polarization within an operating wavelength band.

The outer cladding 36 preferably surrounds, and is in contact with, the annular depressed cladding region 12. The outer cladding 36 preferably has a conventional outer diameter of about 125 microns and has a composition of preferably substantially pure silica. Optionally, outer cladding 36 may include other suitable dopants, such as fluorine, and the outer diameter may be reduced, if size constraints so dictate.

General representations of the relative refractive index profiles of the single polarization fiber 30 are illustrated in FIGS. 3 and 4 along the X-X and Y-Y axes, respectively. The plots show relative refractive index percent (Delta %) charted versus the fiber radius (in microns) and distinctly illustrates the PDL differences in the profiles along both such axes. In particular, the plots illustrate the maximum relative refractive index of the central core 34, Δ1, the relative refractive index of the hole 26 (shown truncated—because of its depth), and the maximum relative refractive index of the annular depressed cladding segment 12, Δ2. The relative refractive index of air is about $n_{air}$=1.0, as such, the Delta % is very negative (estimated about −54%). The dotted portion 38 of the profile reflects a fiber 30 wherein the portion 32 has a round shape (illustrated by dotted line 38—See FIG. 2). Thus, it should be readily recognized that the refractive index profiles along each axis are very different. It is preferred that the length of the fiber 30 is designed to be in a range about 10 centimeters to 1 meter and the sufficient differential polarization dependent loss (PDL) is greater than 70 dB over the single polarization wavelength range.

Figure 7:
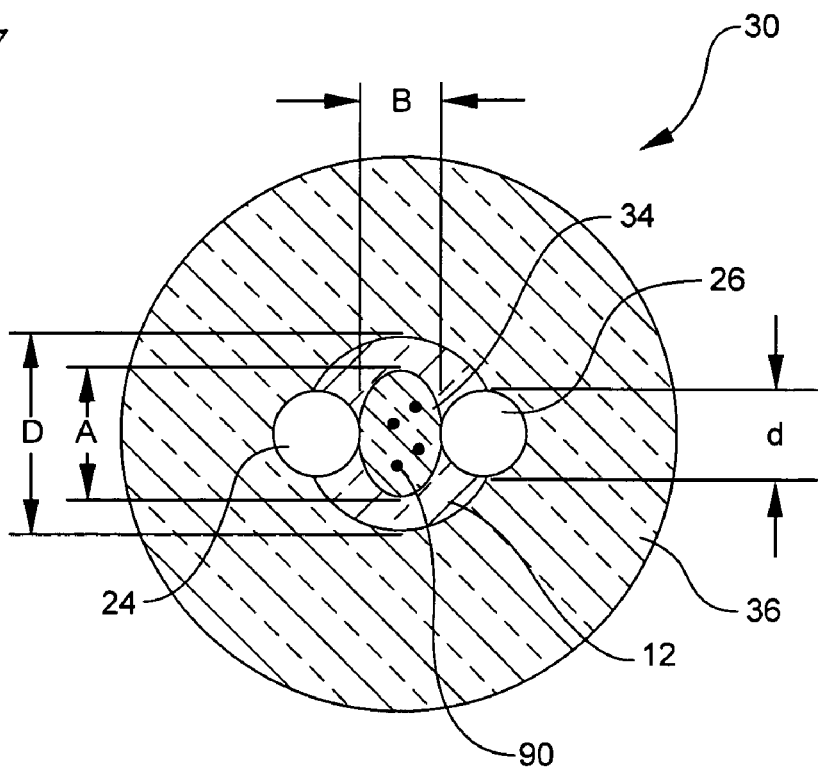
FIG. 7 is a cross-sectional view of a second embodiment of the single polarization optical fiber 30 of FIG. 1 in accordance with embodiments of the present invention.

Referring to FIG. 7, another embodiment of the single polarization fiber 30 is shown. The fiber 30 includes an elliptically-shaped central core 34, circular cross section air holes 24, 26 positioned on either side of the central core alongside the short dimension of the elliptical core, an annular depressed cladding region 12, and an outer cladding region 36. In this embodiment, the holes 24, 26 are formed partially in the annular depressed cladding region 12 and partially in the outer cladding 36. The annular depressed cladding region 12 is fluorine-doped sufficiently to provide a delta % of about −0.4%. Outer cladding 36 is manufactured from preferably pure silica. The ranges for d (diameter of the holes), maximum and minimum dimensions, A and B, and diameter of the annular region, D, given above are equally suitable for this embodiment.

Figure 8:
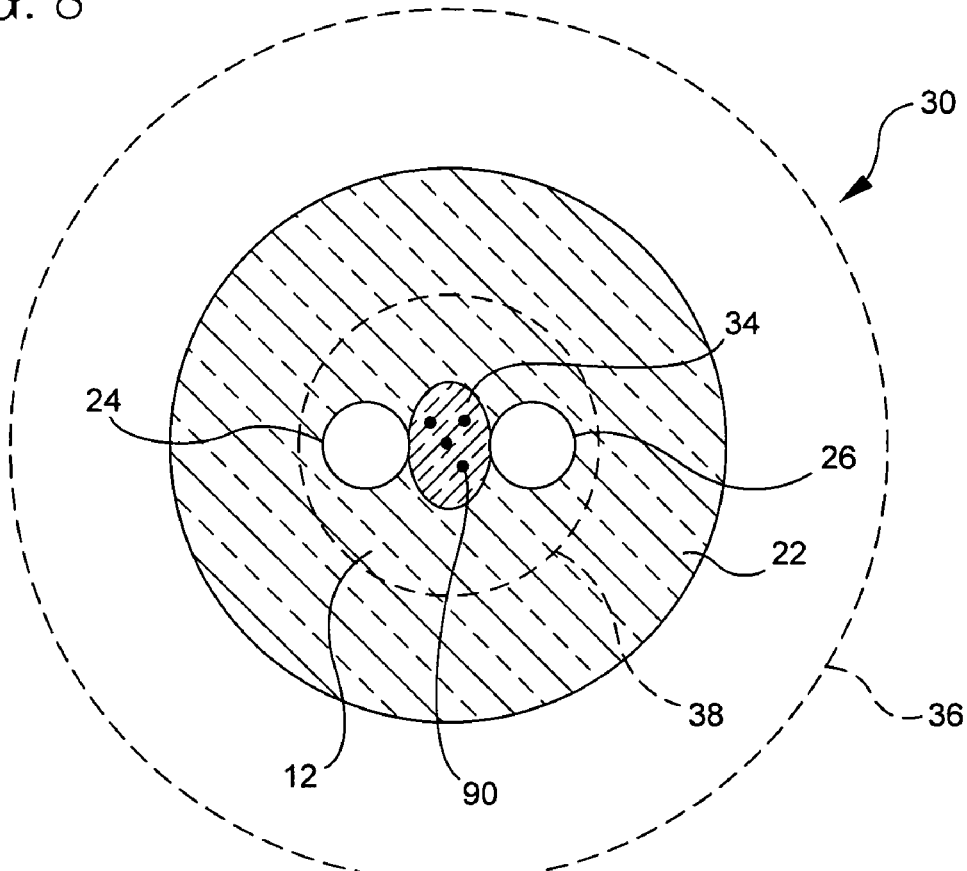
FIG. 8 is a cross-sectional view of a third embodiment of the single polarization optical fiber 30 of FIG. 1 in accordance with embodiments of the present invention.

Referring to FIG. 8, still another embodiment of the single polarization fiber 30 is shown. In this embodiment, the fiber 30 includes elliptically-shaped central core 34, circular air holes 24, 26 positioned on either side of the central core alongside the short dimension of the elliptical core, and a cladding region 22. In this embodiment, the holes 24, 26 are formed in an annular region 12, but the annular region is manufactured from the same material as the cladding 22, which is preferably pure silica. The dotted line 38 indicates an interface between the core and cladding regions which is positioned at a radius larger than the outermost portion of the holes 24, 26. In this embodiment of fiber 30, the core delta, Δ1%, is preferably about 1.6% for a single clad version of a single polarization fiber laser or amplifier. Even though shown circular, as with the other embodiments, the inner cladding 22 can be elliptically shaped or rectangularly shaped with a 200×400 square micron rectangular cross section having an NA of 0.3. Moreover, an optional dual clad version of the single polarization fiber laser or amplifier can be implemented with an additional optional outer cladding 36.

The single polarization fiber 30 according to embodiments of the present invention each exhibit optical properties enabling single polarization (transmission of one, and only one, polarization mode) within the designed SPB 48 (See FIG. 6). Preferably, the SPB 48 of the single polarization fiber 30 according to the invention is designed to be located between about 800-1600 nm. Most preferably, the fiber's SPB 48 will be designed such that it coincides with 980, 1060, 1080, 1310 or 1550 nm such that it is readily useable with optical components operating at 980, 1060, 1080, 1310 or 1550 nm. In particular, according to the teachings of the present invention, it is preferred that the center wavelength of the SPB substantially coincides (within about +/−20 nm) with the center wavelength of the operating wavelength of the fiber laser or amplifier, as selected or tuned by the input mirror or grating 60 of FIG. 1. Further, the PZ fiber 30 in accordance with the invention preferably exhibit an extinction ratio at 978 nm of equal to or greater than 15 dB; and more preferably equal to or greater than 20 dB within the SPB 48.

Experimental Example 1

A first representative single polarization fiber 30 according to the invention was manufactured having the cross-sectional structure shown in FIG. 7. The fiber 30 has a central core 34 having an average diameter, d avg, of about 5.33 microns, a maximum dimension, A, of about 7.75 microns, a minimum dimension, B, of about 2.9 microns—resulting in a first aspect ratio A/B equal to about 2.7, a central core delta, Δ1, of 1.1%, and an alpha profile having an α of about 2. The holes 24, 26 were partially included in the annular region 12 and partially included in the cladding 22. Holes 24, 26 had an average diameter of about 8.3 microns. The annular region 12 was fluorine-doped thereby being depressed relative to the pure silica cladding 22. The relative refractive index, Δ2, of the annular region 12 was −0.4% and the outer diameter D of the annular region 12 was about 16 microns. The holes 24, 26, in this embodiment, substantially abutted the sides of the central core 34. The single polarization fiber 30, for example, was tested and exhibited an extinction ratio, ER, of about 38.6 dB over a length of 1.51 m at a wavelength of 978 nm. The ER was about 15 in the SPB 48. The fiber's beat length was found to be 4.21 mm. Attenuation was measured to be 0.027 dB/m at 978 nm on a length of 1.45 m.

Experimental Example 2 and 3

Other portions of the same fiber along the length thereof (and spaced from the length of Exp. Ex. 1) were also tested in Exp. Ex. 2 and 3 giving slightly different performance results. It was determined by the inventors that this variation in properties along the length of the fiber was due predominantly to process control variations in the prototype fiber which in a production fiber would be in much better control.

Experimental Example 4

A further experimental sample is shown in Table 2 as Exp. Ex. 4. In this example, the core delta, Δ1, was 2.0% and Δ2, was −0.4%. In this example, the Aspect Ratio, AR1, was about 3.2 having an average core diameter, d avg, of about 4 microns ({A+B}/2). Average hole diameters and other fiber parameters were similar to example 1. As is demonstrated by this example, raising the relative refractive index of the central core to 2.0% has increased the Single Polarization (SP) bandwidth to 42 nm as compared to 1.1%.

The optical properties of the single polarization fiber described above and additional experimental fibers are given in Table 2.

TABLE 2

Optical Properties For Experimental Example Fibers

| Example # | Exp. Ex. 1 | Exp. Ex. 2 | Exp. Ex. 3 | Exp. Ex. 4 |
|---|---|---|---|---|
| Extinction Ratio ER (dB) in the SPB | 15 | 22 | 20 | >15 |
| Beat Lengt $L_B$ (mm) | 4.21 | 3.89 | 2.79 | 1.11 |
| Attenuation (dB/m) | 0.027 | — | — | 1.76 |
| P1 Cutoff λ1 (nm) | 1157 | 1147 | 1164 | 972 |
| P2 Cutoff λ2 (nm) | 1183 | 1175 | 1097 | 1014 |
| SP Band Bandwidth (nm) | 26 | 28 | 33 | 42 |

Referring to FIG. 6, a plot illustrating the Single Polarization Bandwidth (SPB) 48 for the Experimental Example 1 fiber of FIG. 7 is shown by showing traces of transmission power (dB) versus wavelength (nm) for the different polarization modes 45, 50 of the fiber 30. In particular, first 45 and second 50 polarizations were measured and plotted as a function of wavelength.

The extinction ratio at 978 nm was generated by passing a light signal from a 978 nm single wavelength pump laser with a bandwidth of 0.5 nm through a short length of the fiber and then measuring the transmitted power at a wavelength of 978 nm. Likewise, the ER may be measure in the same way within the SPB. The transmission power was measured along the two polarizations at the fiber's output end, while at the input end, a polarizer is aligned with each one of the birefringent axes, in turn. The extinction ratio, ER, was determined by using the equation:

$$ER = 10 \log p1/p2$$

where
p2 is the power in the second polarization, and
p1 is the power in the first polarization.

Beat length $L_B$ was also measured using a wavelength scanning technique by determining the modulation period, $\Delta\lambda$, in the source's spectrum and the fiber's length L. Two polarizers were inserted before and after the fiber. The beat length $L_B$ (mm) is calculated according to the equation:

$$L_B = \{\Delta\lambda L\}/\lambda$$

where $\lambda$ is the center wavelength (nm) of the source. In this measurement, a broadband ASE source is employed and the modulation period is obtained by performing a Fourier transform. The wavelength of the ASE source was 940-1020 nm and the center wavelength was 980 nm. The measured beat length was 4.21 mm.

Likewise, the cutoff wavelength of the first polarization, $\lambda 1$, cutoff wavelength of the second polarization, $\lambda 2$, and Single Polarization Bandwidth (difference between the cutoff wavelengths of the two polarization modes) are determined. For each measurement a non-polarized white light source is used which has a flat spectrum from 300-2000 nm. A polarizer is then inserted at the light launching end and set to the two polarization axes determined from the measurement of the extinction ratio to perform the cutoff testing for each polarization.

The attenuation of the single polarization fiber is measured by measuring the power p1 on a first length (approx. 3 m) of fiber and then cutting the fiber into a shorter length (approx. 1 m) and measuring the power p2. The attenuation is then calculated as:

$$\text{Attn} = [10 \log p1 - 10 \log p2]/L$$

where L is the length removed. The attenuation is measured at 978 nm.

Figure 9:
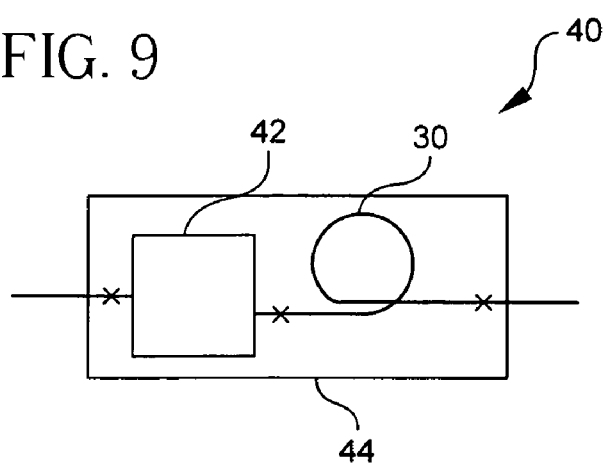
FIGS. 9-11 are schematic views of systems including the single polarization optically active optical fiber 30 in accordance with embodiments of the present invention being optically coupled to an optical component.

Referring to FIG. 9, one system 40 employing the single polarization fiber 30 according to the embodiments of the single polarization fiber described herein is illustrated. The system 40 includes an optical device 42, such as a laser, gyroscope, sensor, modulator, beam splitter, polarization multiplexer, or the like having the fiber 30 in accordance with the invention included therein or attached thereto. The fiber 30 and the optical component 42 may be included in a further housing 44 and comprise subcomponents therein.

Figure 10:
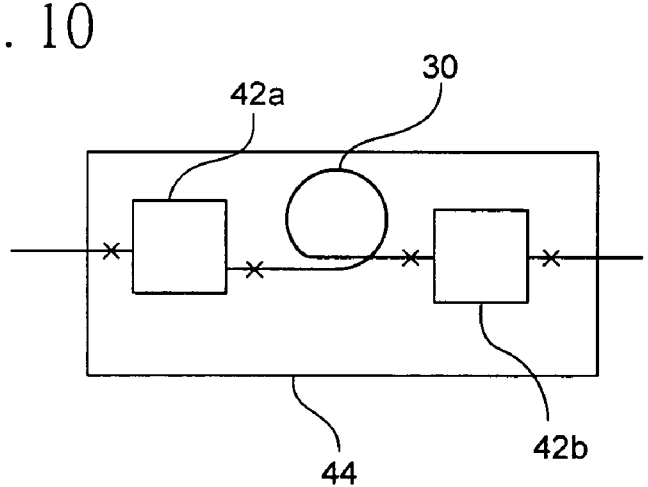

Referring to FIG. 10, a system 140 wherein the fiber 30 in accordance with embodiments of the invention is attached between optical components 42a, 42b and wherein the fiber and the optical components are optionally contained within a housing 44 is illustrated.

Figure 2:
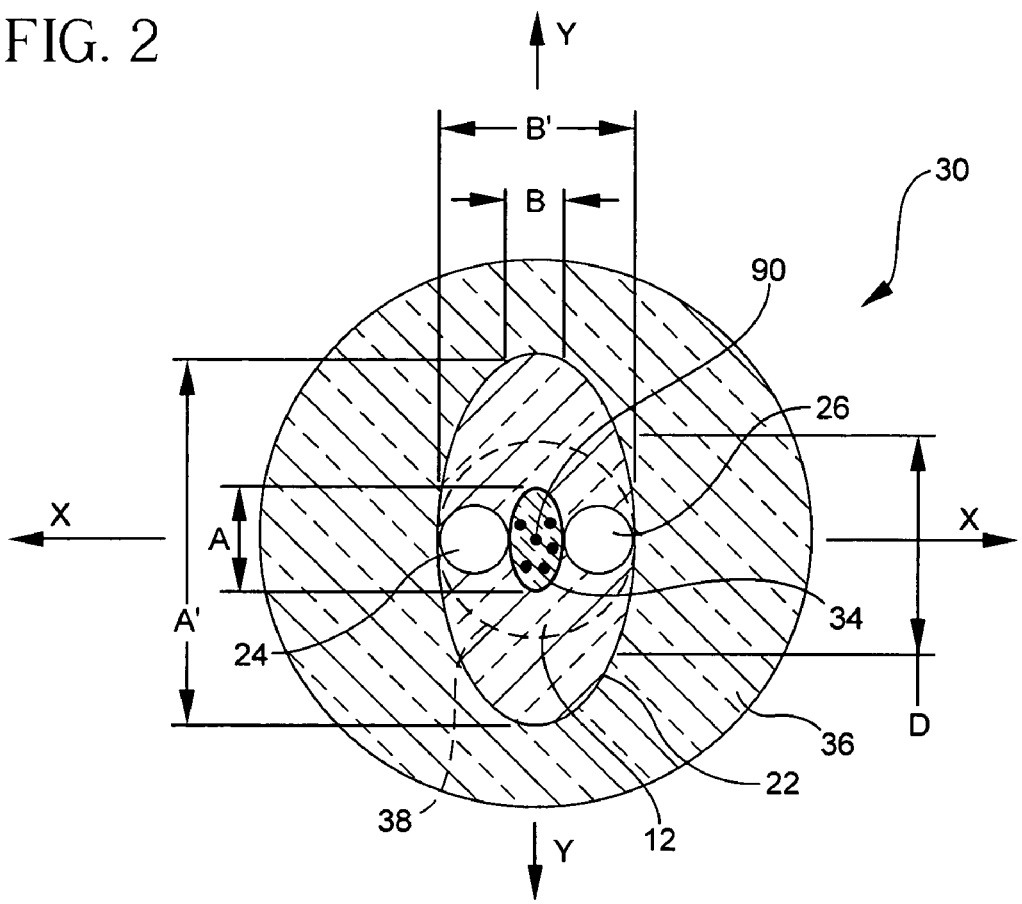
FIG. 2 is a cross-sectional view of a first embodiment of the single polarization optically active optical fiber 30 of FIG. 1 in accordance with the present invention.
Figure 11:
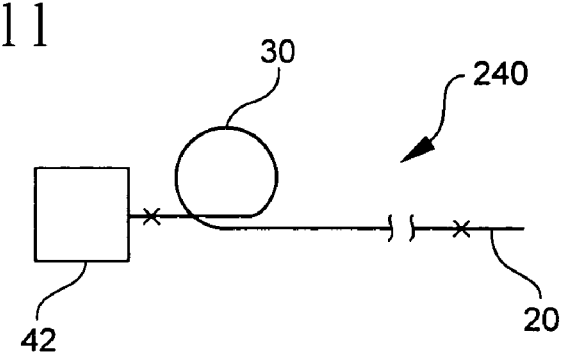
Figure 13:
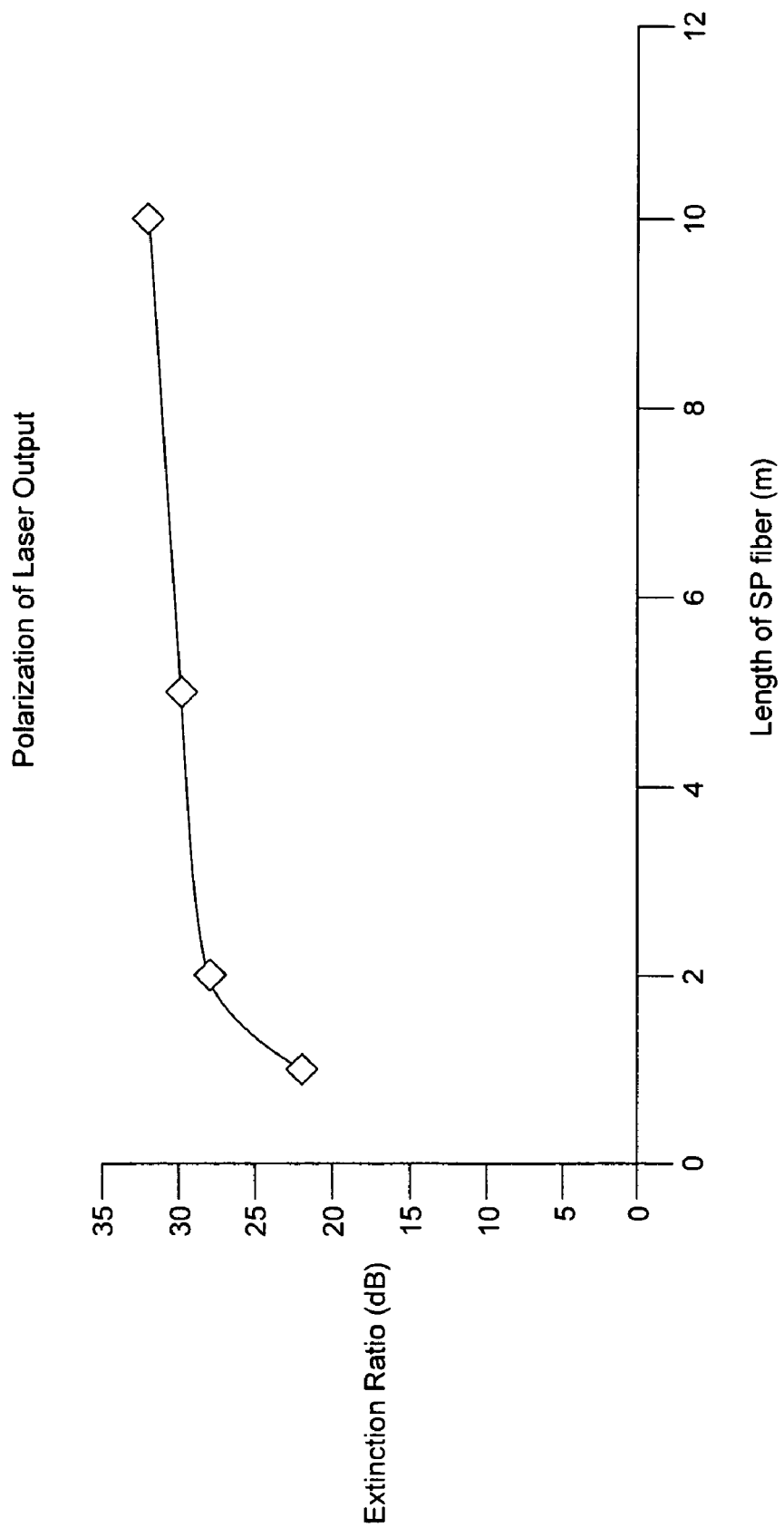
FIG. 13 is a graph of the extinction ratio as a function of length for the single polarization fiber 30' of FIG. 12, in accordance with the invention.

Referring to FIG. 11, a system 240 wherein the fiber 30 in accordance with embodiments of the invention is attached to an optical component 42 and wherein the fiber is optically coupled to another type of fiber 20, as exemplified by FIG. 2. It would be appreciated that the splicing of the SP fiber 30 and another type of fiber 20 can be in any sequence with various combinations of FIGS. 9-11, as illustrated in FIG. 13.

Figure 12:
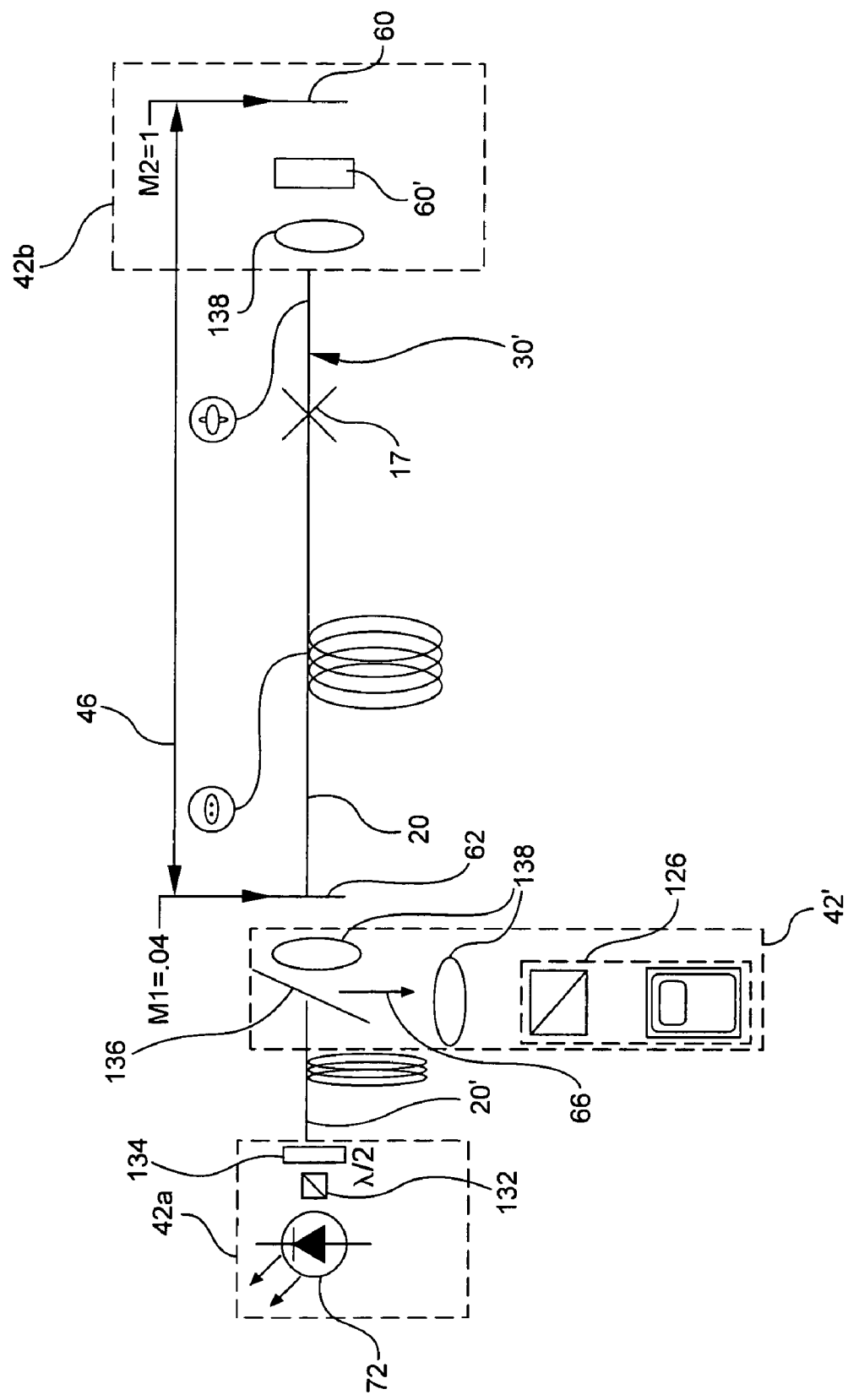
FIG. 12 is a schematic view of a laser cavity including an undoped version of the single polarization optical fiber 30' with a doped elliptical core of a fiber section to form an optically active linearly birefringent and linearly dichroic fiber in accordance with another embodiment of the present invention being optically coupled to an optical component.

Referring to FIG. 12, an un-polarized pump 72 at 980 nm optically pumps a 10 m fiber section of a Yb-doped gain fiber 20 that is fusion-spliced to a passive single polarization (SP) fiber 30 to provide a linearly single polarized ytterbium-doped fiber laser. For a double-clad implementation, the pump 72 pumps a laser cavity 46 that includes the birefringent ytterbium-doped fiber 20 having an elliptical core that is fusion spliced to a passive (undoped) single-polarization fiber 30'. The resultant linearly polarized ytterbium-doped fiber laser from optically pumping of the linearly birefringent and linearly dichroic fiber formed from the doped fiber section 20 and the undoped SP fiber section 30' exhibited a polarization extinction ratio greater than 30 dB in this exemplary implementation.

A linearly polarized ytterbium-doped fiber laser can thus result from just optically pumping of the linearly birefringent and linearly dichroic fiber formed from the doped fiber section 20 and the undoped SP fiber section 30' in a forward pumping direction as in FIG. 1. However, to illustrate that a backward reflection is also possible, additional elements are added in FIG. 12. A 500 m polarization maintaining PM fiber section 20' is a PANDA fiber, commercially available from Corning Incorporated, that does not contain ytterbium doping. Single polarization operation is introduced through the introduction of a polarizing beamsplitter 132 and a lambda/2 waveplate 134 in front of the laser cavity 46. The cavity 46 which includes the elliptical core gain fiber 20 and the single-polarization fiber 30 was pumped with unpolarized light from the unpolarized pumping source or pump laser 72. An extinction ratio in excess of 1000:1 was measured.

The 10 m gain fiber 20 was doped with 6000 ppm weight ytterbium. The birefringence was derived from an elliptical core of dimensions 7.9 µm×3.5 cm. This birefringence corresponded to a group polarization beatlength of 7 mm at 1 µm. The pump laser 72 was a high power (500 mW) single-stripe laser diode operating at about 974.5 nm (available at the time from Corning-Lasertron). The pump light was depolarized by launching at 45 degrees to the polarization axes of the 500-m-long polarization maintaining fiber (Corning PM980) 20' via the beam splitter 132 and the waveplate 134. The resultant degree of polarization of the pump was less than 1%.

The undoped single polarization fiber 30' possessed a polarization-dependent propagation cutoff wavelength for the fundamental transverse mode. Through this differential cutoff, there was a wavelength range (similar to bandwidth 48 in FIG. 6) for which only a single polarization propagated.

The laser cavity 46 was constructed by fusion splicing the 10-m-long section of the Yb-doped elliptical core fiber 20 to the undoped single polarization fiber 30'. The polarization eigenaxes of these two fibers were aligned in a splicer 17 (Fujikura 40-PM) for polarization-maintaining fiber. A transmission null was detected by rotating the elliptical core fiber 20 and the single polarization fiber 30 at the junction and an analyzer polarizer 126 at the output. The splice loss between the elliptical core fiber 20 and the undoped single polarization fiber 30' was estimated to be less than 1 dB.

To assure the operating wavelength of the fiber laser was within the single polarization bandwidth 48 of the single polarization fiber 30', a bulk 1080-nm bandpass filter 60' was placed in the cavity 46. The Fabry-Perot fiber cavity 46 was bounded by a gold-coated high reflector 60 (R>99.9%) on one end and the 3.5% Fresnel reflection of the fiber facet-air interface 62 on the other end. Lenses 138 are transparent and used to couple light into and out of the such formed linearly birefringent and linearly dichroic fiber 20 and 30'. The only reflections are due to the gold mirror 60 at one end and the fiber:air interface 62 at the pump input end.

The laser output 66 was taken at the pump end of the fiber laser by placing a microscope cover slide 136 obliquely in the pump/signal path. Care was taken to orient the slide 136 far away from Brewster's angle to avoid spurious polarization effects.

The laser produced an output power of 50 mW at a launched power of about 150 mW. The cavity was not optimized to obtain the highest output power. The single polarization fiber was cut back to determine the shortest length required to produce a high degree of linearly polarized output.

Figure 14:
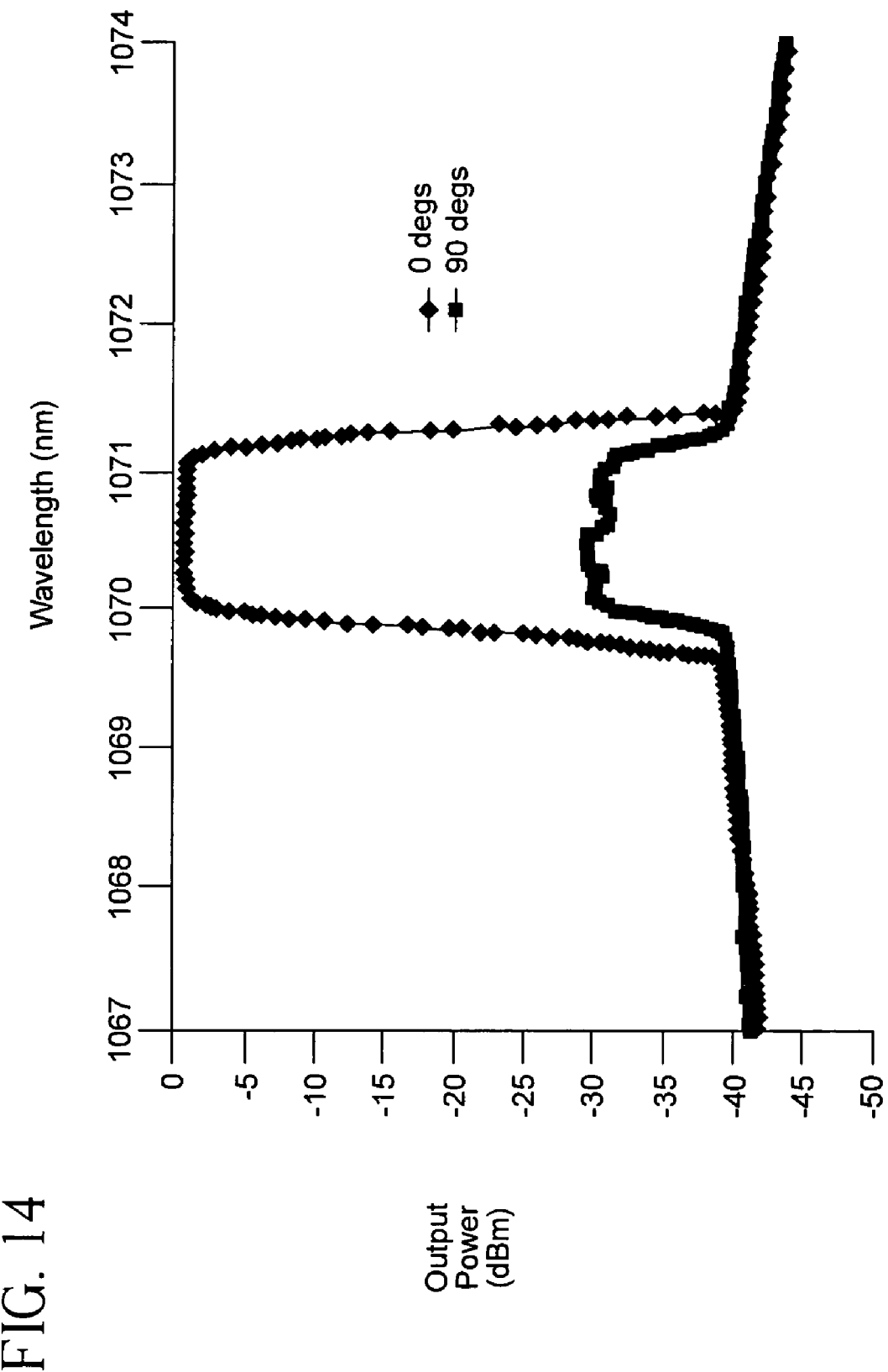
FIG. 14 is a graph of the output spectra for orthogonally polarized axes for the laser of FIG. 12, in accordance with the invention.

Referring to FIG. 13, the polarization extinction ratio as a function of the length of the single polarization fiber 30 is shown. For example, an extinction ratio of 30 dB was obtained using a 5-m length of single polarization fiber 30. The output spectra for each orthogonally polarized axis are shown in FIG. 14 for the resultant fiber laser.

Figure 15:
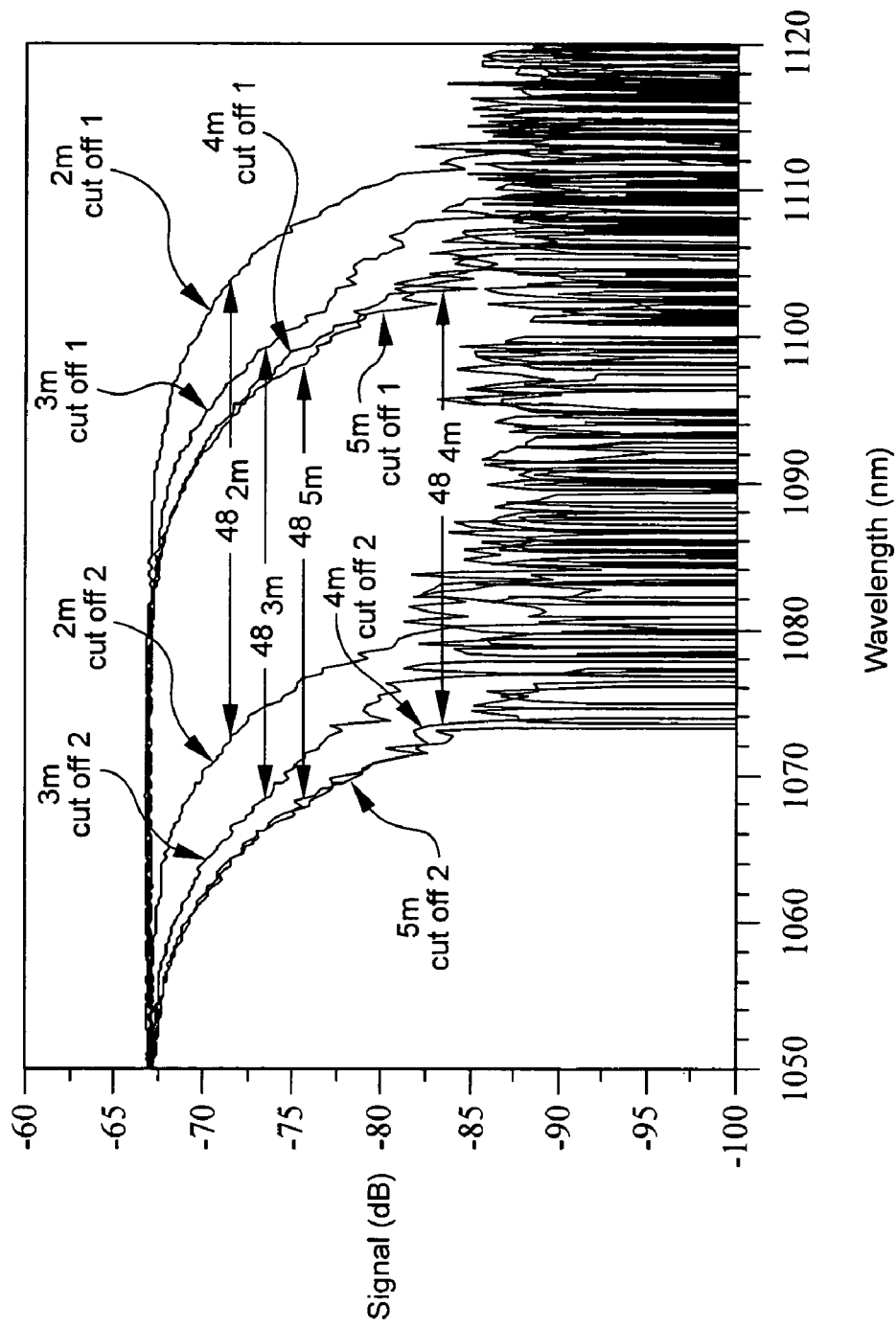
FIG. 15 is a graph of the fundamental mode cutoff spectra for each polarization of the single polarization fiber 30' of FIG. 12, in accordance with the invention.
Figure 16:
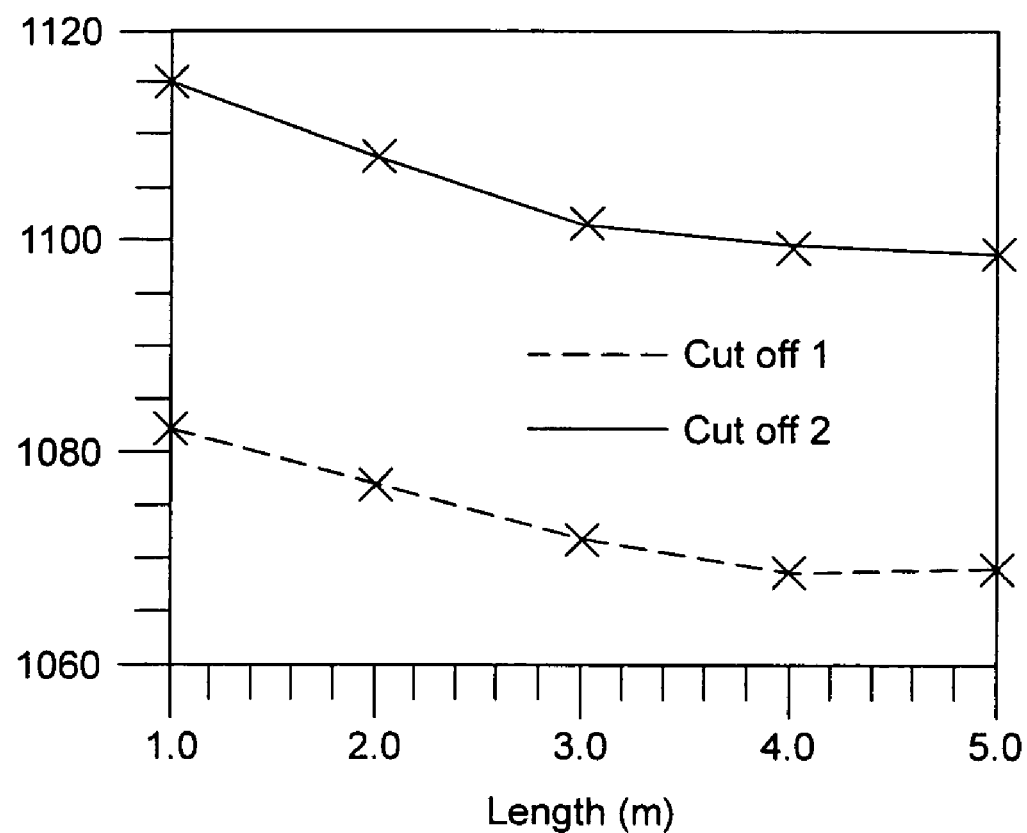
FIG. 16 is a graph of the fundamental mode cutoff spectra for each polarization of the single polarization fiber 30' of FIG. 15, as a function of length, in accordance with the invention.

Referring to FIG. 15, the single polarization fiber 30 exhibited a polarization dependent cutoff wavelength. The cutoff wavelength for each polarization eigenmode as a function of fiber length is illustrated in FIG. 16. For a given length, the polarizing wavelength band of this fiber is described by the difference between the two curves (Cutoff1 and Cutoff2) in FIG. 16 or 15. For example, for a two-meter-long fiber, only a single polarization will propagate in this fiber 30 in the wavelength range 1070-1117 nm as the single polarization bandwidth 48 similar to FIG. 6. Hence, it can be seen from FIG. 14, that the gain bandwidth of the laser of about 1070-1071 nm overlaps with an edge of the single polarization wavelength range of 1070-1117 nm at about the bandpass filter selected wavelength of about 1070 nm.

To investigate the effect of the single polarization fiber 30' as a function of length, the laser was chosen to operate at 1070 nm, the short wavelength edge of the single polarization passband 48. This 1070 nm wavelength was attained by rotating the angle of incidence of the 1080-nm band pass filter with respect to the propagating intravcavity beam. From FIG. 15, the length dependence of the polarization dependent loss is greater here than at the center of the single polarization window 48. An extinction ratio greater than 20 dB was attained with a single polarization fiber 30' length as short as 1 m as shown in FIG. 13.

Hence, a linearly polarized fiber laser can be implemented through the use of an undoped single polarization fiber 30' added to a doped elliptical core fiber section 20. A degree of linear polarization in excess of 1000:1 was measured. This fiber laser can be further optimized through the use of fiber gratings to provide more refine wavelength selective feedback to align the gain bandwidth to overlap with the single polarization wavelength range at a different location.

It will be apparent to those skilled in the art that variations and modifications can be made to the present invention without departing from the scope of the invention. Thus, it is intended that the present invention cover the modifications and variations of this invention provided they come within the scope of the appended claims and their equivalents.

What is claimed is:

1. A method for generating a linear single-polarization output beam, the method comprising the steps of:
   providing an optically active linearly birefringent and linearly dichroic fiber for propagating light and having a single polarization wavelength range and a gain bandwidth;
   optically pumping the optically active linearly birefringent and linearly dichroic fiber for obtaining fluorescence within the gain bandwidth; and
   aligning the single-polarization wavelength range to overlap a desired spectral region of the gain bandwidth.

2. A method for generating a linear single-polarization output beam, the method comprising the steps of:
   providing an optically active linearly birefringent and linearly dichroic fiber for propagating light and having a single polarization wavelength range and a gain bandwidth, the single-polarization wavelength range overlapping a desired spectral region of the gain bandwidth, the fiber having a polarization dependent loss equal to or greater than 3 dB within the single polarization wavelength range; and
   optically pumping the optically active linearly birefringent and linearly dichroic fiber for obtaining fluorescence within the gain bandwidth.

3. The method of claim 2 wherein the step of providing an optically active linearly birefringent and linearly dichroic fiber further comprises providing an optically active linearly birefringent and linearly dichroic fiber having a polarization dependent loss equal to or greater than 15 dB within the single polarization wavelength range.

4. The method of claim 2 wherein the step of providing an optically active linearly birefringent and linearly dichroic fiber further comprises providing an optically active linearly birefringent and linearly dichroic fiber having a polarization dependent loss equal to or greater than 20 dB within the single polarization wavelength range.

* * * * *